US012794654B2

(12) United States Patent
Lin et al.

(10) Patent No.: US 12,794,654 B2
(45) Date of Patent: Nov. 10, 2026

(54) METHOD AND APPARATUS FOR ACTIVATING TRS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Xue Lin, Dongguan (CN); Shukun Wang, Dongguan (CN)

(73) Assignee: GUANGDONG OPPO MOBILE TELECOMMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/430,531

(22) Filed: Feb. 1, 2024

(65) Prior Publication Data

US 2024/0250800 A1 Jul. 25, 2024

Related U.S. Application Data

(63) Continuation of application No. PCT/CN2021/119705, filed on Sep. 22, 2021.

(51) Int. Cl.
*H04L 5/00* (2006.01)

(52) U.S. Cl.
CPC ............ *H04L 5/0098* (2013.01); *H04L 5/005* (2013.01)

(58) Field of Classification Search
CPC ......... H04L 5/0098; H04L 5/005; H04L 5/00; H04L 5/001; H04L 5/0048; H04W 72/04
See application file for complete search history.

(56) References Cited

U.S. PATENT DOCUMENTS

| | | | | |
|---|---|---|---|---|
| 2019/0356444 A1* | 11/2019 | Noh | ...................... | H04W 72/23 |
| 2020/0413478 A1 | 12/2020 | Si | | |
| 2021/0067291 A1* | 3/2021 | Gao | ...................... | H04L 5/0048 |
| 2021/0135821 A1* | 5/2021 | Guan | .................... | H04L 5/0048 |
| 2022/0086676 A1* | 3/2022 | Ai | ......................... | H04W 24/10 |
| 2023/0224833 A1* | 7/2023 | Wang | .................... | H04L 5/0098 370/350 |
| 2023/0318784 A1* | 10/2023 | Hu | .......................... | H04L 5/001 370/329 |
| 2023/0422165 A1* | 12/2023 | Sun | ......................... | H04L 5/001 |
| 2024/0063991 A1* | 2/2024 | Liu | ......................... | H04L 5/001 |

(Continued)

FOREIGN PATENT DOCUMENTS

| | | |
|---|---|---|
| CN | 110149178 A | 8/2019 |
| CN | 110166192 A | 8/2019 |
| CN | 111934837 A | 11/2020 |

OTHER PUBLICATIONS

OPPO. "Discussion on TRS Activation for Fast SCell Activation", 3GPP TSG-RAN WG2 Meeting #114 Electronic R2-2104943, May 11, 2021 (May 11, 2021), sections 1-3. 4 pages.

(Continued)

*Primary Examiner* — Christine Ng
(74) *Attorney, Agent, or Firm* — Ladas & Parry LLP

(57) ABSTRACT

Embodiments of the present application provide a method and apparatus for activating a TRS, a terminal device, and a network device. The method includes: a terminal device receives a first MAC CE sent by a network device, the first MAC CE being used for indicating whether each of multiple SCells is to be activated or deactivated and being used for indicating whether a TRS of at least part of the multiple SCells are to be activated.

20 Claims, 17 Drawing Sheets

(56) References Cited

U.S. PATENT DOCUMENTS

| | | | | |
|---|---|---|---|---|
| 2024/0080169 | A1* | 3/2024 | He | H04L 5/0048 |
| 2024/0235774 | A1* | 7/2024 | Nimbalker | H04L 5/0051 |

OTHER PUBLICATIONS

Futurewel. "Support Efficient Activation/De-activation Mechanism for SCells", 3GPP TSG RAN WG1 Meeting #105-e R1-2104206, May 11, 2021 (May 11, 2021), sections 1-3. 15 pages.

ZTE. "Discussion on Support Efficient Activation/De-activation Mechanism for SCells in NR CA", 3GPP TSG RAN WG1 #106-e R1-2106750, Aug. 7, 2021 (Aug. 7, 2021), sections 1-3. 5 pages.

International Search Report in the international application No. PCT/CN2021/119705, mailed on Jun. 6, 2022. 7 pages with English translation.

Written Opinion of the International Search Authority in the international application No. PCT/CN2021/119705, mailed on Jun. 6, 2022. 8 pages with English translation.

Moderator (Huawei). "Summary#3 of efficient SCell activation/deactivation mechanism of NR CA", 3GPP TSG RAN WG1 Meeting #105-e R1-2106327, e-Meeting, May 10-27, 2021, the whole document. 63 pages.

Huawei. "Revised WID on Further Multi-RAT Dual-Connectivity enhancements", 3GPP TSG RAN Meeting #88e RP-201040(revision of RP-193249), Electronic Meeting, Jun. 29-Jul. 3, 2020, the whole document. 4 pages.

MCC Support, "Draft Report of 3GPP TSG RAN WG1 #105-e v0.1.0 (Online meeting, May 10-27, 2021)", 3GPP TSG RAN WG1 Meeting #106-e R1-210xxxx, e-Meeting, Aug. 16-27, 2021, pp. 115. 141 pages.

"RAN1 Chair's Notes", 3GPP TSG RAN WG1 #106-e, e-Meeting, Aug. 16-27, 2021, pp. 135. 146 pages.

* cited by examiner

<table>
<tr><td>$C_7$</td><td>$C_6$</td><td>$C_5$</td><td>$C_4$</td><td>$C_3$</td><td>$C_2$</td><td>$C_1$</td><td>R</td><td>Oct 1</td></tr>
<tr><td colspan="4">TRS index</td><td colspan="4">TRS index</td><td>Oct 2</td></tr>
<tr><td colspan="2">TRS burst</td><td colspan="2">TRS offset</td><td colspan="4">TRS index</td><td>Oct 3</td></tr>
<tr><td colspan="2">TRS burst</td><td colspan="2">TRS offset</td><td colspan="4">TRS index</td><td>Oct 4</td></tr>
</table>

FIG. 8

<table>
<tr><td>$C_7$</td><td>$C_6$</td><td>$C_5$</td><td>$C_4$</td><td>$C_3$</td><td>$C_2$</td><td>$C_1$</td><td>R</td><td>Oct 1</td></tr>
<tr><td>$C'_7$</td><td>$C'_6$</td><td>$C'_5$</td><td>$C'_4$</td><td>$C'_3$</td><td>$C'_2$</td><td>$C'_1$</td><td>R</td><td>Oct 2</td></tr>
<tr><td colspan="4">TRS index</td><td colspan="2">TRS burst</td><td colspan="2">TRS offset</td><td>Oct 3</td></tr>
<tr><td colspan="4">TRS index</td><td colspan="2">TRS burst</td><td colspan="2">TRS offset</td><td>Oct 4</td></tr>
</table>

FIG. 9

| | | | | |
|---|---|---|---|---|
| $C_7$ | $C_6$ | $C_5$ | $C_4$ | Oct 1 |
| $C_3$ | $C_2$ | $C_1$ | R | Oct 2 |
| TRS index | | TRS burst | TRS offset | Oct 3 |
| TRS index | | TRS burst | TRS offset | Oct 4 |

FIG. 11

| | | | | | | | | |
|---|---|---|---|---|---|---|---|---|
| $C_7$ | $C_6$ | $C_5$ | $C_4$ | $C_3$ | $C_2$ | $C_1$ | R | Oct 1 |
| Trigger state | | | | | R | | | Oct 2 |

FIG. 12

METHOD AND APPARATUS FOR ACTIVATING TRS, TERMINAL DEVICE, AND NETWORK DEVICE

CROSS-REFERENCE TO RELATED APPLICATION

This application is a continuation of International Application No. PCT/CN2021/119705 filed on Sep. 22, 2021, the disclosure of which is hereby incorporated by reference in its entirety.

BACKGROUND

During a process of activating a Serving Cell (SCell), an activation delay of the SCell is mainly affected by a Synchronization Signal Block (SSB) period. If a terminal device just misses an SSB period after receiving an SCell activation instruction, the activation delay of the SCell will be prolonged. In order to solve this problem, a TRS may be introduced to replace the SSB, thus realizing faster activation of the SCell. However, how to activate the TRS is an unsolved problem.

SUMMARY

Embodiments of the present disclosure relate to the technical field of mobile communications, and provide methods and devices for activating a TRS, a terminal device, a network device, chips, computer readable storage media, computer program products and computer programs.

The method for activating a TRS provided by the embodiment of the present disclosure includes following operation. A terminal device receives a first Media Access Control (MAC) Control Element (CE) sent by a network device, where the first MAC CE is used for indicating whether each of multiple Serving Cells (SCells) is to be activated or deactivated, and indicating whether TRSs of at least part of the multiple SCells are to be activated.

The method for activating a TRS provided by the embodiment of the present disclosure includes following operation. A network device sends a first Media Access Control (MAC) Control Element (CE) to a terminal device, where the first MAC CE is used for indicating whether each of multiple Serving Cells (SCells) is to be activated or deactivated, and indicating whether TRSs of at least part of the multiple SCells are to be activated.

The device for activating a TRS provided by the embodiment of the present disclosure is applied to a terminal device, and the device includes a processor, a memory configured to store computer-executable instructions, and a transceiver. The processor is configured to invoke and run the computer-executable instructions stored in the memory to perform an operation of: receiving, via the transceiver, a first Media Access Control (MAC) Control Element (CE) sent by a network device, wherein the first MAC CE is used for indicating whether each of a plurality of Serving Cells (SCells) is to be activated or deactivated, and indicating whether TRSs of at least part of the plurality of SCells are to be activated.

The device for activating a TRS provided by the embodiment of the present disclosure is applied to a network device, and the device includes a processor, a memory configured to store computer-executable instructions, and a transceiver. The processor is configured to invoke and run the computer-executable instructions stored in the memory to perform an operation of: sending, via the transceiver, a first Media Access Control (MAC) Control Element (CE) to a terminal device, wherein the first MAC CE is used for indicating whether each of a plurality of Serving Cells (SCells) is to be activated or deactivated, and indicating whether TRSs of at least part of the plurality of SCells are to be activated.

BRIEF DESCRIPTION OF THE DRAWINGS

The drawings described herein are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings:

FIG. 8 is a second schematic diagram of a first MAC CE according to an embodiment of the present disclosure.

FIG. 9 is a third schematic diagram of a first MAC CE according to an embodiment of the present disclosure.

FIG. 11 is a fifth schematic diagram of a first MAC CE according to an embodiment of the present disclosure.

FIG. 12 is a sixth schematic diagram of a first MAC CE according to an embodiment of the present disclosure.

DETAILED DESCRIPTION

The technical scheme of the embodiments of the disclosure will be described below in conjunction with the drawings in the embodiments of the disclosure. It is apparent that the described embodiments are parts of the embodiments of the disclosure, not all of the embodiments. With respect to the embodiments of the disclosure, all other embodiments obtained by those skilled in the art without creative effort fall within the scope of protection of the disclosure.

Figure 1:
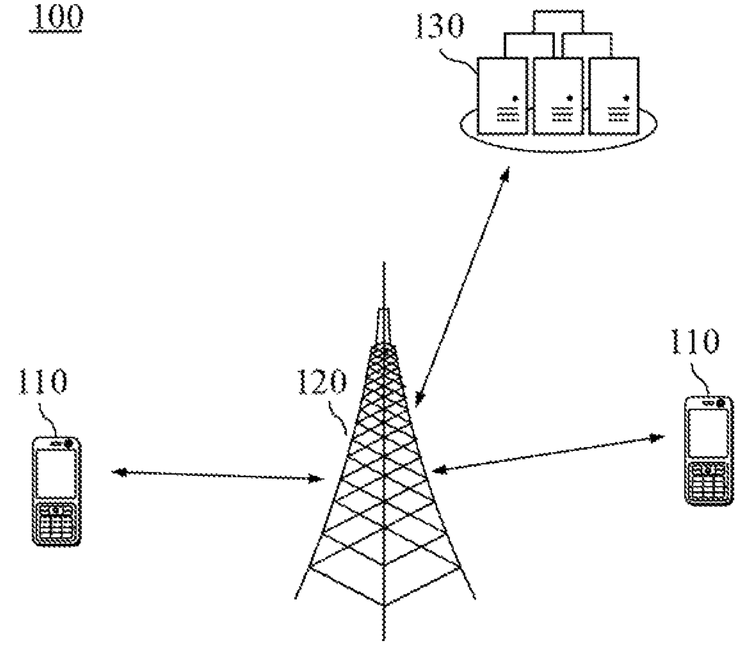
FIG. 1 is a schematic diagram of an application scenario of an embodiment of the present disclosure.

FIG. 1 is a diagram of a scenario to which a communication method is applied according to an embodiment of the present disclosure.

As shown in FIG. 1, the communication system 100 may include a terminal device 110 and a network device 120. The network device 120 may communicate with the terminal device 110 through an air interface. Multi-service transmission is supported between the terminal device 110 and the network device 120.

It should be understood that the embodiments of the present disclosure are only illustrative with the communication system 100 but are not limited thereto. That is to say, the technical schemes of the embodiments of the present disclosure can be applied to various communication systems, such as: a Long Term Evolution (LTE) system, a LTE Time Division Duplex (TDD), an Universal Mobile Telecommunications System (UMTS), an Internet of Things (IOT) system, a Narrow Band Internet of Things (NB-IOT) system, an Enhanced Machine-Type Communications (eMTC) system, a 5G communication system (also referred to as a New Radio (NR) communication system), or future communication system, etc.

In the communication system 100 shown in FIG. 1, the network device 120 may be an access network device that communicates with the terminal device 110. The access network device may provide communication coverage for a particular geographic area and may communicate with a terminal device 110 (e.g. a UE) located within the coverage.

The network device 120 may be an Evolved Node B (also called as eNB or eNodeB) in the LTE system, or a Next Generation Radio Access Network (NG RAN) device, or a base station (gNB) in the NR system, or a wireless controller in a Cloud Radio Access Network (CRAN), or the network device 120 may be a relay station, an access point, a vehicle-mounted device, a wearable device, a hub, a switch, a bridge, a router, or a network device in a future evolved Public Land Mobile Network (PLMN), etc.

The terminal device 110 may be any terminal device including, but not limited to, a terminal device in wired or wireless connection with the network device 120 or other terminal devices.

For example, the terminal device 110 may be an access terminal, a UE, a subscriber unit, a subscriber station, a mobile station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network or a terminal device in a future evolution network, etc.

The terminal device 110 may be used for the Device To Device (D2D) communication.

The wireless communication system 100 may also include a core network device 130 that communicates with the base station. The core network device 130 may be a 5G Core (5GC) device, for example, an Access And Mobility Management Function (AMF), for another example, an Authentication Server Function (AUSF), for another example, a User Plane Function (UPF), and for another example, a Session Management Function (SMF). Optionally, the core network device 130 may also be an Evolved Packet Core (EPC) device of the LTE network, for example, a Session Management Function+Core Packet Gateway (SMF+PGW-C) device. It should be understood that SMF+PGW-C device can implement the functions implemented by the SMF and PGW-C. In a process of network evolution, the core network device may also be called by other names, or a new network entity may be formed by partitioning the functions of the core network, which is not limited in the embodiments of the present disclosure.

The communication between the functional units of the communication system 100 may be implemented by establishing a connection through a next generation (NG) interface.

For example, the terminal device sets up the air interface connection with the access network device through a NR interface, to transmit user plane data and control plane signaling. The terminal device may set up a control plane signaling connection with an AMF through an NG interface 1 (abbreviated as N1). The access network device, such as the gNB, may set up a user plane data connection with a UPF through an NG interface 3 (abbreviated as N3). The access network device may set up control plane signaling connection with the AMF through an NG interface 2 (abbreviated as N2). The UPF may set up the control plane signaling connection with an SMF through an NG interface 4 (abbreviated as N4). The UPF may exchange user plane data with a data network through an NG interface 6 (abbreviated as N6). The AMF may set up the control plane signaling connection with the SMF through an NG interface 11 (abbreviated as N11). The SMF may set up the control plane signaling connection with a PCF through an NG Interface 7 (abbreviated as N7).

FIG. 1 exemplarily illustrates one base station, one core network device and two terminal devices. Optionally, the wireless communication system 100 may include multiple base station devices and other numbers of the terminal devices may be included within the coverage of each base station, which is not limited in the embodiments of the present disclosure.

It should be noted that FIG. 1 only illustrates by way of example the system to which the present disclosure applies and of course the method shown in the embodiment of the present disclosure may also be applied to other systems. In addition, the terms “system” and “network” herein are often used interchangeably herein. In this disclosure, the term “and/or” is only to describe an association relationship between associated objects and represents that three kinds of relationships may exist. For example, A and/or B may represent three conditions: i.e., independent existence of A, existence of both A and B and independent existence of B. In addition, the character “/” in the present disclosure generally indicates that the associated objects before and after this character is in an “or” relationship. It should be understood that the reference to “indication” in the embodiments of the present disclosure may be a direct indication, may be an indirect indication, or may be indicative of an association. For example, A indicates B, which may mean that A directly indicates B, for example, B may be obtained through A; it may also mean that A indirectly indicates B, for example, A indicates C, and B may be obtained by C; and it may also indicate that there is an association between A and B. It should also be understood that the term “correspondence” may mean that there is a direct correspondence or an indirect correspondence between the two, may also mean that there is an association relationship between the two, and may also be a relationship between indication and being indicated, configuration and being configured, etc. It should also be understood that “predefined” or “predefined rules”

may be achieved by pre-storing corresponding codes, tables or other means used for indicating relevant information in devices (e.g., including terminal devices and network devices), and the present disclosure is not limited to the specific implementation thereof. For example, predefined may refer to what is defined in the protocol. It should also be understood that, in the embodiments of the present disclosure, the "protocol" may be a standard protocol in the communication field. For example, the protocol may include an LTE protocol, an NR protocol, and related protocols applied in future communication systems, which are not limited in the present disclosure.

In order to facilitate understanding of the technical schemes of the embodiments of the present disclosure, the technical technology related to the embodiments of the present disclosure are described below, and the following related technologies, as optional schemes, can be arbitrarily combined with the technical schemes of the embodiments of the present disclosure, all of which belong to the protection scope of the embodiments of the present disclosure.

With people's pursuit of speed, latency, high-speed mobility and energy efficiency, as well as the diversity and complexity of business in future life, the International Organization for Standardization (ISO) of the 3rd Generation Partnership Project (3GPP) began to develop the 5G mobile communication technology (hereinafter referred to as 5G for short). The main application scenarios of 5G are: enhanced Mobile Broadband (cMBB), Ultra-Reliable Low-Latency Communications (URLLC) and massive Machine-Type Communications (mMTC).

On one hand, eMBB still aims at users' access to multimedia content, services and data, the demand of eMBB is growing rapidly. On the other hand, cMBB may be deployed in different scenarios, such as indoor, urban and rural areas, and the capabilities and the demand of eMBB are quite different in different scenarios, so it cannot be generalized and must be analyzed in detail in combination with specific deployment scenarios. Typical applications of URLLC include industrial automation, power automation, telemedicine operation (surgery), traffic safety and so on. The typical characteristics of mMTC include high connection density, small data volume, delay-insensitive services, low cost and long service life of modules and so on.

In the early deployment of NR systems, it is difficult to obtain complete NR coverage, so the typical network coverage is in a mode of wide-area LTE coverage and NR island coverage. Moreover, a large number of LTE systems are deployed below 6 GHz, and there are few spectra below 6 GHz available for 5G. Therefore, NR must study the application of spectra above 6 GHZ, but the coverage of high frequency band is limited and the signal fades quickly. Furthermore, in order to protect the early investment of mobile operators in LTE, a working mode of tight interworking between LTE and NR is proposed.

In order to be able to implement the 5G network deployment and commercial applications as soon as possible, the 3GPP first completed the first 5G version, i.e., the EN-DC (LTE-NR Dual connectivity). In the EN-DC, an LTE base station (eNB) serves as a Master Node (MN), an NR base station (gNB or en-gNB) serves as a Secondary Node (SN), and the two base stations are connected to an EPC core network. In the later stage of R15, other Dual Connectivity (DC) modes will be supported, i.e., NE-DC (New radio E-UTRA DC), 5GC-EN-DC and NR DC (New Radio DC). In the NE-DC, an NR base station serves as the MN, an evolved LTE (eLTE) base station serves as the SN, and the two base stations are connected to the 5GC core network. In the 5GC-EN-DC, the eLTE base station serves as the MN, the NR base station serves as the SN, and the two base stations are connected to the 5GC core network. In the NR DC, the NR base station is used as the MN, the NR base station serves as the SN, and the two base stations are connected to the 5GC core network.

In 5G, the maximum channel bandwidth can be 400 MHZ (which is called wideband carrier), which is very large compared with the maximum bandwidth of 20 MHz in LTE. In order to meet the requirement of high rate, the CA technology is supported in 5G. The CA technology jointly schedules and uses resources on multiple Component Carriers (CCs), so that NR systems can support larger bandwidth, thus higher peak rate of the system can be achieved. According to the continuity of the aggregated carriers in spectrum, the CA can be divided into continuous carrier aggregation and discontinuous carrier aggregation; according to whether the aggregated carriers are located in a same band, the CA can be divided into Intra-band carrier aggregation and inter-band carrier aggregation.

In the CA, there is one and only one Primary Component Carrier (PCC, also referred to as primary cell component), and the PCC provides an RRC signaling connection, a Non-Access Stratrum (NAS) function, security and so on. The Physical Uplink Control Channel (PUCCH) exists on and only on the PCC. In the CA, there can be one or more Secondary Component Carriers (SCCs, also referred to as secondary cell components), and the SCC only provides additional radio resources. The PCC and SCC are both called serving cells, the cell on the PCC is the primary cell (Pcell) and the cell on the SCC is the secondary cell (Scell).

Figure 2:
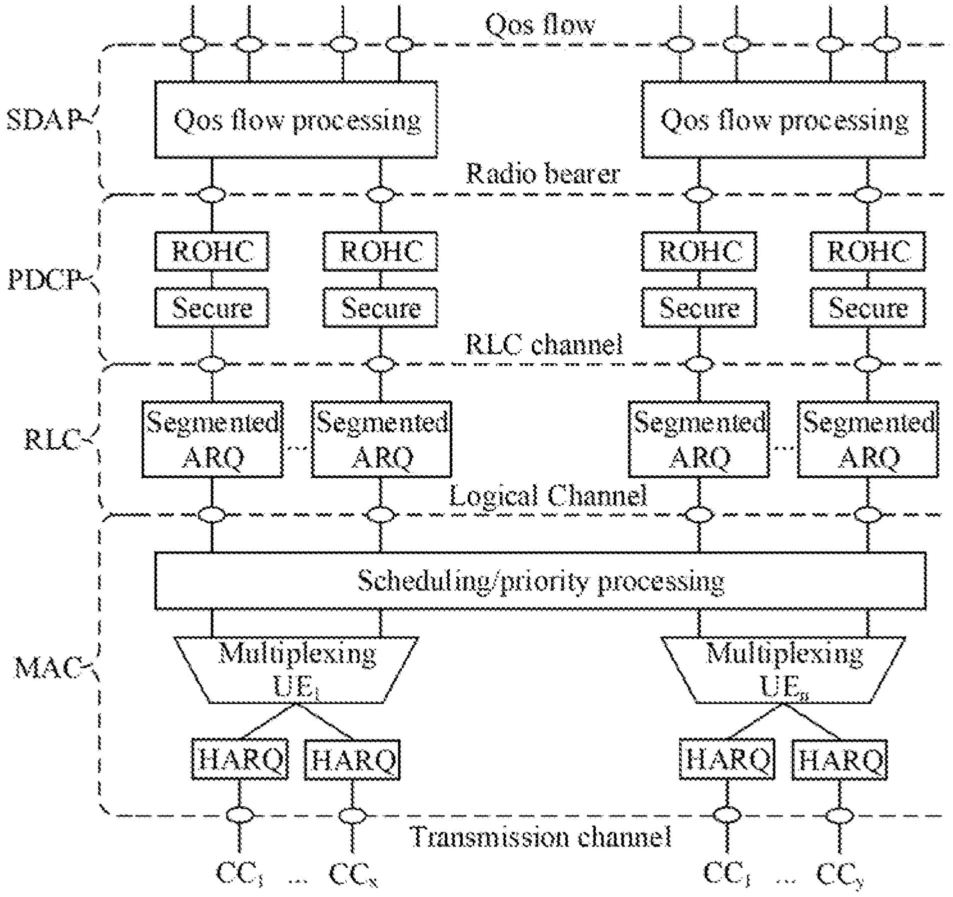
FIG. 2 is an architecture diagram of a downlink protocol stack in a carrier aggregation scenario according to an embodiment of the present disclosure.
Figure 3:
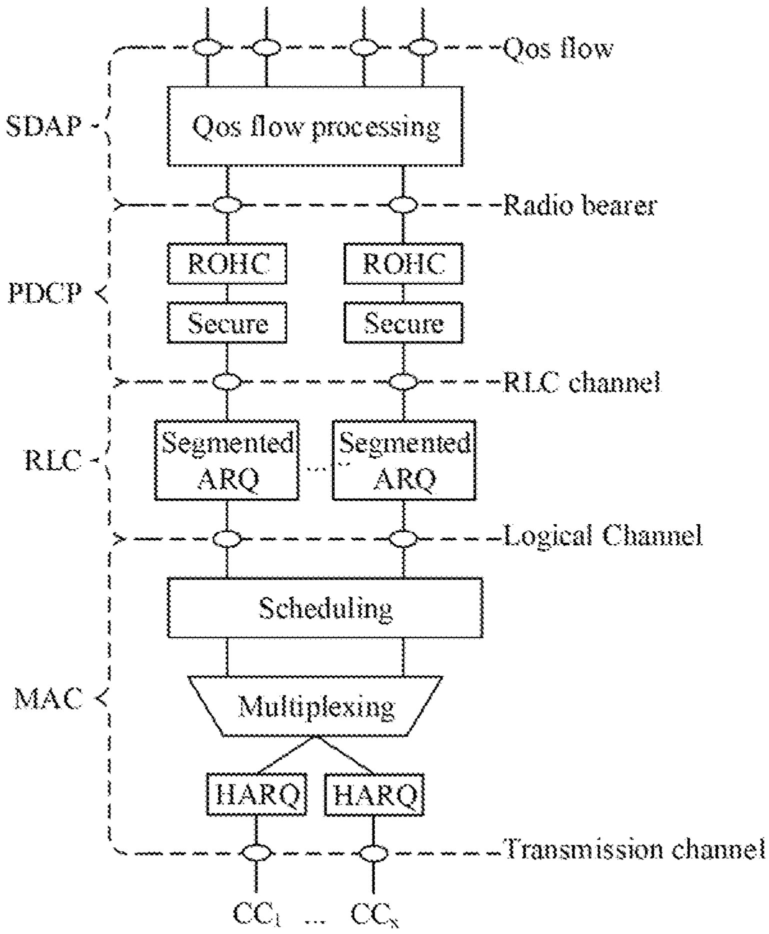
FIG. 3 is an architecture diagram of an uplink protocol stack in a carrier aggregation scenario according to an embodiment of the present disclosure.

FIG. 2 and FIG. 3 are architecture diagrams of protocol stacks in a CA scenario. FIG. 2 is a protocol stack architecture diagram for the downlink and FIG. 3 is a protocol stack architecture diagram for the uplink. It can be seen that in the CA, all carriers share one Media Access Control (MAC) entity, and each carrier corresponds to a Hybrid Automatic Repeat-reQuest (HARQ) entity. Each HARQ entity maintains its own multiple HARQ processes.

Figure 4:
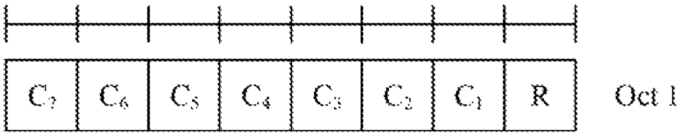
FIG. 4 is a first schematic diagram of an SCell activation/deactivation MAC CE according to an embodiment of the present disclosure.
Figure 5:
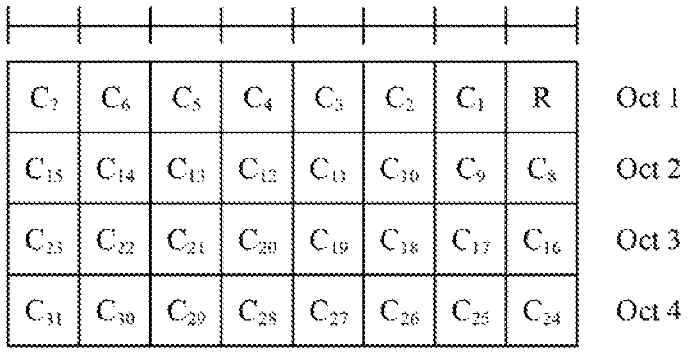
FIG. 5 is a second schematic diagram of an SCell activation/deactivation MAC CE according to an embodiment of the present disclosure.

The network device may instruct the terminal device to activate one or more SCells and/or deactivate one or more SCells through an MAC CE, and the MAC CE may be referred to as an SCell activation/deactivation MAC CE. The SCell activation/deactivation MAC CE has a fixed length. As an implementation, the length of the SCell activation/deactivation MAC CE is 1 byte, which is adaptable to a scenario where the network device configures the terminal device with less than or equal to 7 SCells. As another implementation, the length of the SCell activation/deactivation MAC CE is fixed to 4 bytes, which is adaptable to a scenario where the network device configures the terminal device with more than 7 and less than or equal to 31 SCells. The two lengths of MAC CE are respectively associated with different Logical Channel Identifies (LCIDs), and the terminal device may distinguish the MAC CEs having two lengths according to the LCIDs. As shown in FIG. 4, the SCell activation/deactivation MAC CE has the length of 1 byte and controls the states of 7 SCells. As shown in FIG. 5, the SCell activation/deactivation MAC CE has the length of 4 bytes and controls the states of 31 SCells. $C_i$ represents activation/deactivation indication information corresponding to an SCell with an SCell index of i. If a value of $C_i$ is 1, $C_i$ is used for indicating the activation of the SCell with the SCell index of i; and if the value of $C_i$ is 0, $C_i$ is used for indicating the deactivation of the SCell with the SCell index of i. Furthermore, if the network device does not configure the SCell with the SCell index of i for the terminal device, the terminal device ignores the value of $C_i$. In addition, R represents a reserved bit, and the value of R is 0 by default.

In the process of activating the SCell, it is assumed that the terminal device receives the MAC CE for indicating the activation of the SCell on the time slot n, then the terminal device sends a Channel State Information (CSI) report and performs the activation of the SCell at a time not later than:

$$n+\frac{T_{HARQ}+T_{activation\_time}+T_{CSI\_Reporting}}{\text{slot length}}$$

where slot length represents the slot length and is associated with the subcarrier spacing; $T_{HARQ}$ represents a time corresponding to the HARQ; $T_{activation\_time}$ represents a time when the SCell is to be activated; $T_{CSI\_Reporting}$ represents a time when the CSI report is reported. The SCell activation delay is mainly affected by the parameter $T_{activation\_time}$, and $T_{activation\_time}$ depends on the SSB period. As an example, the SSB period may be 5 ms, 10 ms, 20 ms, 40 ms, 80 ms or 160 ms. If the terminal device misses an SSB period after receiving the MAC CE for indicating the activation of the SCell, the activation delay of the SCell will be prolonged. In order to solve this problem, the TRS may be introduced to replace the SSB, thus realizing faster activation of the SCell. However, how to activate the TRS is an unsolved problem.

In view of this, the following technical schemes in the embodiments of the present disclosure are proposed.

In order to facilitate understanding of the technical schemes of the embodiments of the present disclosure, the technical schemes of the present disclosure will be described in detail below by way of specific embodiments. The above related technologies, as optional schemes, may be arbitrarily combined with the technical schemes of the embodiments of the present disclosure, and all of these combinations fall witin the protection scope of the embodiments of the present disclosure. The embodiments of the present disclosure include at least some of following contents.

Figure 6:
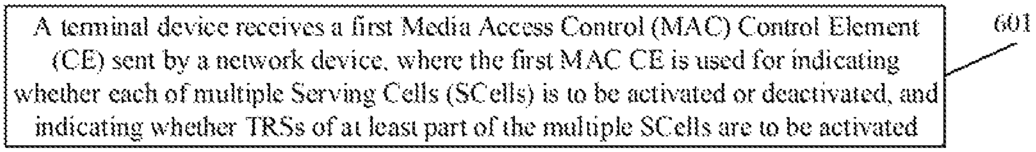
FIG. 6 is a flowchart of a method for activating a TRS according to an embodiment of the present disclosure.

FIG. 6 is a flowchart of a method for activating a TRS according to an embodiment of the present disclosure. As shown in FIG. 6, the method for activating a TRS includes operation 601.

In operation 601, a terminal device receives a first Media Access Control (MAC) Control Element (CE) sent by a network device, where the first MAC CE is used for indicating whether each of multiple Serving Cells (SCells) is to be activated or deactivated, and indicating whether TRSs of at least part of the multiple SCells are to be activated.

In the embodiment of the present disclosure, the network device sends the first MAC CE to the terminal device, and accordingly, the terminal device receives the first MAC CE sent by the network device. The first MAC CE is used for indicating whether each of multiple SCells is to be activated or deactivated, and indicating whether TRSs of at least part of the multiple SCells are to be activated. In some alternative implementations, the network device is a base station.

It should be noted that the name of the first MAC CE is not limited in the technical scheme of the embodiment of the present disclosure.

The specific implementations of the first MAC CE are described below.

First Scheme

In the embodiment of the present disclosure, the first MAC CE carries first information and second information. The first information is used for indicating whether each of the multiple SCells is to be activated or deactivated, and the second information is used for indicating whether the TRSs of the at least part of the multiple SCells are to be activated.

In some alternative implementations, the second information is used for indicating whether the TRSs of part of the multiple SCells are to be activated. The part of the SCells includes to-be-activated SCells among the multiple SCells.

Specifically, at least one first SCell of the multiple SCells is to be activated through indication of the first information, and the second information is used for indicating whether a TRS of the at least one first SCell is to be activated. The second information includes TRS information corresponding to each of the at least one first SCell, where the TRS information is used for indicating whether a TRS of a first SCell corresponding to the TRS information is to be activated.

It should be noted that the “first SCell” herein generally refers to a to-be-activated SCell.

The contents of the TRS information corresponding to the first SCell will be described below.

In the embodiment of the present disclosure, the TRS information includes a TRS index, a value of the TRS index being used for indicating whether the TRS is to be activated.

In some alternative implementations, when the value of the TRS index is a first value, the TRS index is used for indicating that the TRS is not to be activated; and when the value of the TRS index is not the first value, the TRS index is used for indicating that the TRS is to be activated.

Furthermore, in some alternative implementations, the TRS index is further used for indicating a TRS configuration in a case where the value of the TRS index is not the first value.

Furthermore, in some alternative implementations, the TRS information further includes at least one of TRS burst information or TRS offset information.

Herein, the TRS burst information is used for determining a number of successive TRS contained in the TRS burst. The TRS offset information is used for determining a starting time-domain position of a first TRS in the TRS burst.

As an example, the TRS information includes a TRS index, TRS burst information and TRS offset information. A value of the TRS index is used for indicating whether the TRS is to be activated. Specifically, if the value of the TRS index is the first value, the TRS index is used for indicating that the TRS is not to be activated; and if the value of the TRS index is not the first value, the TRS index is used for indicating that the TRS is to be activated. Furthermore, the TRS index is also used for indicating a TRS configuration. Herein, the TRS configuration includes information such as time-frequency resources of the TRS.

As an example, the TRS information includes a TRS index. A value of the TRS index is used for indicating whether the TRS is to be activated. Specifically, if the value of the TRS index is the first value, the TRS index is used for indicating that the TRS is not to be activated; and if the value of the TRS index is not the first value, the TRS index is used for indicating that the TRS is to be activated. Furthermore, the TRS index is also used for indicating a TRS configuration. Herein, the TRS configuration includes: information such as time-frequency resources of the TRS; TRS burst information; and TRS offset information.

In the above scheme, as an example, the first value is 0. Herein, in a case where the TRS index is an all-0 sequence, the value of the TRS index is 0.

In the above scheme, the length of the first information is fixed. As an implementation, the first information occupies 1 byte and is used for indicating whether each of 7 SCells is to be activated or deactivated, which is adaptable to the scenario where the network device configures the terminal device with less than or equal to 7 SCells. As another implementation, the first information occupies 4 bytes and is used for indicating whether each of 31 SCells is to be activated or deactivated, which is adaptable to the scenario where the network device configures the terminal device with more than 7 and less than or equal to 31 SCells.

In the above scheme, the second information is optionally located after the first information, and the length of the second information is variable. The length of the second information is associated with the number of to-be-activated SCells indicated by the first information. For example, if the number of to-be-activated SCells indicated by the first information is P, then the second information includes TRS information corresponding to P SCells. For the content of each TRS information, reference may be made to the aforementioned scheme.

In the above scheme, the TRS information in the second information has a one-to-one correspondence with the to-be-activated SCell (i.e., the first SCell) among the multiple SCells. Optionally, the TRS information in the second information in an order from front to back corresponds to the at least one first SCell in an ascending order of SCell indexes; or the TRS information in the second information in the order from front to back corresponds to the at least one first SCell in a descending order of SCell indexes.

Second Scheme

In the embodiment of the present disclosure, the first MAC CE carries first information and second information. The first information is used for indicating whether each of the multiple SCells is to be activated or deactivated, and the second information is used for indicating whether the TRSs of the at least part of the multiple SCells are to be activated.

In some alternative implementations, the second information is used for indicating whether the TRSs of part of the multiple SCells are to be activated. The part of the SCells includes to-be-activated SCells among the multiple SCells.

Specifically, at least one first SCell of the multiple SCells is to be activated through indication of the first information, and the second information is used for indicating whether a TRS of the at least one first SCell is to be activated. The second information includes TRS information corresponding to each of the at least one first SCell, where the TRS information is used for indicating whether a TRS of a first SCell corresponding to the TRS information is to be activated.

It should be noted that the "first SCell" herein generally refers to an to-be-activated SCells.

The contents of the TRS information corresponding to the first SCell will be described below.

In the embodiment of the present disclosure, the TRS information includes a TRS index, a value of the TRS index being used for indicating whether the TRS is to be activated.

In some alternative implementations, when the value of the TRS index is a first value, the TRS index is used for indicating that the TRS is not to be activated; and when the value of the TRS index is not the first value, the TRS index is used for indicating that the TRS is to be activated.

Furthermore, in some alternative implementations, the TRS index is further used for indicating a TRS configuration in a case where the value of the TRS index is not the first value.

Furthermore, in some alternative implementations, the TRS information includes only the TRS index in a case where the value of the TRS index is the first value; and the TRS information further includes at least one of TRS burst information or TRS offset information in a case where the value of the TRS index is not the first value.

Herein, the TRS burst information is used for determining a number of successive TRS contained in the TRS burst. The TRS offset information is used for determining a starting time-domain position of the first TRS in the TRS burst.

In the above scheme, as an example, the first value is 0. Herein, in a case where the TRS index is an all-0 sequence, the value of the TRS index is 0

In the above scheme, the length of the first information is fixed. As an implementation, the first information occupies 1 byte and is used for indicating whether each of 7 SCells is to be activated or deactivated, which is adaptable to the scenario where the network device configures the terminal device with less than or equal to 7 SCells. As another implementation, the first information occupies 4 bytes and is used for indicating whether each of 31 SCells is to be activated or deactivated, which is adaptable to the scenario where the network device configures the terminal device with more than 7 and less than or equal to 31 SCells.

In the above scheme, the second information is optionally located after the first information, and the length of the second information is variable. The length of the second information is associated with the number of to-be-activated SCells indicated by the first information. For example, if the number of to-be-activated SCells indicated by the first information is P, then the second information includes TRS information corresponding to P SCells. For the content of each TRS information, reference may be made to the aforementioned scheme.

In the above scheme, the TRS information in the second information has a one-to-one correspondence with the to-be-activated SCell (i.e., the first SCell) among the multiple SCells. Optionally, the TRS information in the second information in an order from front to back corresponds to the at least one first SCell in an ascending order of SCell indexes; or the TRS information in the second information in the order from front to back corresponds to the at least one first SCell in a descending order of SCell indexes.

Third Scheme

In the embodiment of the present disclosure, the first MAC CE carries first information and second information. The first information is used for indicating whether each of the multiple SCells is to be activated or deactivated, and the second information is used for indicating whether the TRSs of the at least part of the multiple SCells are to be activated.

In some alternative implementations, the second information is used for indicating whether the TRSs of part of the multiple SCells are to be activated. The part of the SCells includes to-be-activated SCells among the multiple SCells.

Specifically, at least one first SCell of the multiple SCells is to be activated through indication of the first information, and the second information is used for indicating whether a TRS of the at least one first SCell is to be activated. The second information includes TRS information corresponding to each of the at least one first SCell, where the TRS information is used for indicating whether a TRS of a first SCell corresponding to the TRS information is to be activated.

It should be noted that the "first SCell" herein generally refers to an to-be-activated SCells.

The contents of the TRS information corresponding to the first SCell will be described below.

In the embodiment of the present disclosure, the TRS information includes a first parameter, a value of the first parameter being used for indicating whether the TRS is to be activated. It should be noted that the name of the first parameter is not limited in the technical scheme of the embodiment of the present disclosure. As an example, the first parameter may be named for example an F parameter carried in an F field.

In some alternative implementations, when the value of the first parameter is a first value, the first parameter is used for indicating that the TRS is not to be activated; and when the value of the first parameter is a second value, the first parameter is used for indicating that the TRS is to be activated.

Furthermore, in some alternative implementations, the TRS information includes only the first parameter in a case where the value of the first parameter is the first value; and the TRS information further includes at least one of a TRS index, TRS burst information or TRS offset information in a case where the value of the first parameter is the second value.

As an implementation, the TRS information further includes a TRS index, TRS burst information, and TRS offset information. Herein, the TRS index is used for indicating the TRS configuration, and the TRS configuration includes information such as time-frequency resources of the TRS. The TRS burst information is used for determining a number of successive TRS contained in the TRS burst. The TRS offset information is used for determining a starting time-domain position of the first TRS in the TRS burst.

As an implementation, the TRS information further includes a TRS index.

Herein, the TRS index is used for indicating the TRS configuration and the TRS configuration includes time-frequency resource information of the TRS, TRS burst information, and TRS offset information. The TRS burst information is used for determining a number of successive TRS contained in the TRS burst. The TRS offset information is used for determining a starting time-domain position of the first TRS in the TRS burst.

In the above scheme, as an example, the first value is 0 and the second value is 1. Or, conversely, the first value is 1 and the second value is 0.

In the above scheme, the length of the first information is fixed. As an implementation, the first information occupies 1 byte and is used for indicating whether each of 7 SCells is to be activated or deactivated, which is adaptable to the scenario where the network device configures the terminal device with less than or equal to 7 SCells. As another implementation, the first information occupies 4 bytes and is used for indicating whether each of 31 SCells is to be activated or deactivated, which is adaptable to the scenario where the network device configures the terminal device with more than 7 and less than or equal to 31 SCells.

In the above scheme, the second information is optionally located after the first information, and the length of the second information is variable. The length of the second information is associated with the number of to-be-activated SCells indicated by the first information. For example, if the number of to-be-activated SCells indicated by the first information is P, then the second information includes TRS information corresponding to P SCells. For the content of each TRS information, reference may be made to the aforementioned scheme.

In the above scheme, the TRS information in the second information has a one-to-one correspondence with the to-be-activated SCell (i.e., the first SCell) among the multiple SCells. Optionally, the TRS information in the second information in an order from front to back corresponds to the at least one first SCell in an ascending order of SCell indexes; or the TRS information in the second information in the order from front to back corresponds to the at least one first SCell in a descending order of SCell indexes.

Fourth Scheme

In the embodiment of the present disclosure, the first MAC CE carries first information and second information. The first information is used for indicating whether each of the multiple SCells is to be activated or deactivated, and the second information is used for indicating whether the TRSs of the at least part of the multiple SCells are to be activated.

In some alternative implementations, the second information is used for indicating whether TRSs of all of the multiple SCells are to be activated.

Specifically, the second information including TRS indication information corresponding to each of the multiple SCells, where the TRS indication information is used for indicating whether a TRS of an SCell corresponding to the TRS indication information is to be activated.

In the above scheme, the length of the first information is fixed. As an implementation, the first information occupies 1 byte and is used for indicating whether each of 7 SCells is to be activated or deactivated, which is adaptable to the scenario where the network device configures the terminal device with less than or equal to 7 SCells. As another implementation, the first information occupies 4 bytes and is used for indicating whether each of 31 SCells is to be activated or deactivated, which is adaptable to the scenario where the network device configures the terminal device with more than 7 and less than or equal to 31 SCells.

In the above scheme, the second information is optionally located after the first information, and the length of the second information is fixed. The length of the second information is optionally the same as the length of the first information. For example, if the first information occupies 1 byte, the second information also occupies 1 byte. In this case, the second information is used for indicating whether a TRS of each of the 7 SCells is to be activated. For example, if the first information occupies 4 bytes, the second information also occupies 4 bytes. In this case, the second information is used for indicating whether a TRS of each of the 31 SCells is to be activated.

In the above scheme, the TRS indication information in the second information has a one-to-one correspondence with the multiple SCells. Optionally, the TRS indication information in the second information in an order from lower bit to higher bit of bits occupied by the TRS indication information corresponds to the multiple SCells in an ascending order of SCell indexes; or the TRS indication information in the second information in the order from lower bit to higher bit of the bits occupied by the TRS indication information corresponds to the multiple SCells in a descending order of SCell indexes.

Furthermore, in some alternative implementations, the first MAC CE further carries fourth information including TRS information corresponding to each of at least one target SCell, where the target SCell is a to-be-activated SCell of which the TRS is to be activated.

In some alternative implementations, the TRS information includes at least one of: a TRS index, TRS burst information, or TRS offset information.

As an implementation, the TRS information includes a TRS index, TRS burst information, and TRS offset information. Herein, the TRS index is used for indicating the TRS configuration, and the TRS configuration includes information such as time-frequency resources of the TRS. The TRS burst information is used for determining a number of successive TRS contained in the TRS burst. The TRS offset information is used for determining a starting time-domain position of the first TRS in the TRS burst.

As an implementation, the TRS information further includes a TRS index. Herein, the TRS index is used for indicating the TRS configuration and the TRS configuration includes time-frequency resource information of the TRS, TRS burst information, and TRS offset information. The TRS burst information is used for determining a number of successive TRS contained in the TRS burst. The TRS offset information is used for determining a starting time-domain position of the first TRS in the TRS burst.

In the above scheme, the fourth information is optionally located after the second information and the length of the fourth information is variable. The length of the fourth information is associated with the number of target SCells, and the target SCell is a to-be-activated SCell of which the TRS is to be activated. The target SCell is determined based on the first information and the second information. For example, if the number of target SCells indicated by the first information and the second information is P, the fourth information includes TRS information corresponding to the P SCells. For the content of each TRS information, reference may be made to the aforementioned scheme.

In the above scheme, each piece of the TRS information in the fourth information has a one-to-one correspondence with the target SCell (i.e., the to-be-activated SCell of which the TRS is to be activated) among the multiple SCells. Optionally, the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

Fifth Scheme

In an embodiment of the present disclosure, the first MAC CE carries third information for indicating at least one of: whether each of the multiple SCells is to be activated or deactivated, or whether a TRS of the SCell is to be activated.

In some alternative implementations, the third information includes N bits, each M bits among the N bits corresponds to one SCell, a value of the M bits is used for indicating whether the SCell corresponding to the M bits is to be activated or deactivated, or whether a TRS of the SCell is to be activated, where N and M are positive integers.

In some alternative implementations, when a value of the M bits is a first value, the M bits are used for indicating that the SCell corresponding to the M bits is to be deactivated; when a value of the M bits is a second value, the M bits are used for indicating that the SCell corresponding to the M bits is to be activated and the TRS of the SCell is not to be activated; and when a value of the M bits is a third value, the M bits are used for indicating that the SCell corresponding to the M bits is to be activated and the TRS of the SCell is to be activated.

In the above scheme, taking M=2 as an example, any three of the four values of the two bits may be used as the first value, the second value and the third value, respectively. For example, a value of the 2 bits being 00 represents the first value, a value of the 2 bits being 01 represents the second value, and a value of the 2 bits being 10 represents the third value.

Furthermore, in some alternative implementations, the first MAC CE further carries fourth information including TRS information corresponding to each of at least one target SCell, where the target SCell is a to-be-activated SCell of which the TRS is to be activated.

In some alternative implementations, the TRS information includes at least one of: a TRS index, TRS burst information, or TRS offset information.

As an implementation, the TRS information includes a TRS index, TRS burst information, and TRS offset information. Herein, the TRS index is used for indicating the TRS configuration, and the TRS configuration includes information such as time-frequency resources of the TRS. The TRS burst information is used for determining a number of successive TRS contained in the TRS burst. The TRS offset information is used for determining a starting time-domain position of the first TRS in the TRS burst.

As an implementation, the TRS information further includes a TRS index. Herein, the TRS index is used for indicating the TRS configuration and the TRS configuration includes time-frequency resource information of the TRS, TRS burst information, and TRS offset information. The TRS burst information is used for determining a number of successive TRS contained in the TRS burst. The TRS offset information is used for determining a starting time-domain position of the first TRS in the TRS burst.

In the above scheme, the fourth information is optionally located after the second information and the length of the fourth information is variable. The length of the fourth information is associated with the number of target SCells, and the target SCell is a to-be-activated SCell of which the TRS is to be activated. The target SCell is determined based on the third information. For example, if the number of the target SCells indicated by the third information is P, the fourth information includes TRS information corresponding to the P SCells. For the content of each TRS information, reference may be made to the aforementioned scheme.

In the above scheme, each piece of the TRS information in the fourth information has a one-to-one correspondence with the target SCell (i.e., the to-be-activated SCell of which the TRS is to be activated) among the multiple SCells. Optionally, the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

Sixth Scheme

In an embodiment of the present disclosure, the first MAC CE carries first information and second information. The first information is used for indicating whether each of the multiple SCells is to be activated or deactivated, and the second information is used for indicating whether the TRSs of the at least part of the multiple SCells are to be activated.

In some alternative implementations, the second information is used for indicating whether the TRSs of part of the multiple SCells are to be activated. The part of the SCells includes to-be-activated SCells among the multiple SCells.

Specifically, at least one first SCell of the multiple SCells is to be activated through indication of the first information. The second information includes indication information of a first trigger state, the indication information of the first trigger state being used for indicating that TRSs of one or more first SCells associated with the first trigger state are to be activated.

Furthermore, in some alternative implementations, the indication information of the first trigger state is further used for indicating at least one of the following of the one or more first SCells associated with the first trigger state: TRS configurations, TRS burst information, or TRS offset information.

It should be noted that the network device will configure multiple trigger states for the terminal device, and each trigger state has an association relationship with TRSs of one or more SCells. Optionally, the association relationship may be configured by RRC signaling. The network device indicates that the TRSs of one or more SCells associated with the first trigger state are to be activated by carrying the indication information of the first trigger state in the first MAC CE.

In the above scheme, the length of the first information is fixed. As an implementation, the first information occupies 1 byte and is used for indicating whether each of 7 SCells is to be activated or deactivated, which is adaptable to the scenario where the network device configures the terminal device with less than or equal to 7 SCells. As another implementation, the first information occupies 4 bytes and is used for indicating whether each of 31 SCells is to be activated or deactivated, which is adaptable to the scenario where the network device configures the terminal device with more than 7 and less than or equal to 31 SCells.

In the above scheme, the length of the second information is fixed or variable. As an implementation, the second information includes only indication information of one trigger state. As another implementation, the second information includes indication information of multiple trigger states. In this case, indication of activation of the TRS of the SCell associated with each of the multiple trigger states can be implemented.

The length of (i.e. the number of bits or bytes occupied by) the TRS index, the length of the TRS burst information and the length of the TRS offset information in the technical schemes of the embodiments of the present disclosure may be determined in the following manner. It should be noted that although in the following description the length is represented in the number of bits, the length may be represented in other manners (e.g. in the number of bytes), which are also within the scope of protection of the embodiments of the present disclosure.

The Length of the TRS Index

In the embodiments of the present disclosure, the number of bits occupied by the TRS index is fixed; or, the number of bits occupied by the TRS index is variable.

In option 1-1), in some alternative implementations, in a case where the number of bits occupied by the TRS index is fixed, the number of bits occupied by the TRS index is determined based on a number of TRS configurations supported by a second SCell among the multiple SCells. The second SCell is an SCell supporting a maximum number of TRS configurations among the multiple SCells.

In option 1-2), in some alternative implementations, in a case where the number of bits occupied by the TRS index is variable, the number of bits occupied by the TRS index is determined based on first configuration information sent by the network device.

In the above scheme, optionally, the first configuration information is used for configuring the number of bits occupied by the TRS index with a granularity of SCell; or the first configuration information is used for configuring the number of bits occupied by the TRS index with a granularity of terminal device.

It should be noted that configuring the number of bits occupied by the TRS index with a granularity of SCell is independently configuring the number of bits occupied by a TRS index for each of different SCells. The numbers of bits occupied by the TRS indexes corresponding to different SCells may be different.

It should be noted that configuring the number of bits occupied by the TRS index with a granularity of terminal device is independently configuring the number of bits occupied by a TRS index for each of different terminal devices. The numbers of bits occupied by the TRS indexes corresponding to different terminal devices may be different.

Furthermore, in some alternative implementations, in a case where the first configuration information is used for configuring the number of bits occupied by the TRS index with the granularity of terminal device, there are two configuration modes as follows.

In an explicit configuration mode, the first configuration information includes first indication information for indicating the number of bits occupied by the TRS index corresponding to the terminal device.

Or, in an implicit configuration mode, the first configuration information includes at least one TRS configuration configured for the terminal device, where a number of the at least one TRS configuration is used for determining the number of bits occupied by the TRS index corresponding to the terminal device.

The Length of TRS Burst Information

In the embodiments of the present disclosure, the number of bits occupied by the TRS burst information is fixed; or the number of bits occupied by the TRS burst information is variable.

In option 2-1), in some alternative implementations, in a case where the number of bits occupied by the TRS burst information is fixed, the number of bits occupied by the TRS burst information is determined based on a number of TRS bursts supported by a third SCell among the multiple SCells, where the third SCell is an SCell supporting a maximum number of TRS bursts among the multiple SCells.

In option 2-2), in some alternative implementations, in a case where the number of bits occupied by the TRS burst information is variable, the number of bits occupied by the TRS burst information is determined based on second configuration information sent by the network device.

In the above scheme, optionally, the second configuration information is used for configuring the number of bits occupied by the TRS burst information with a granularity of SCell; or the second configuration information is used for configuring the number of bits occupied by the TRS burst information with a granularity of terminal device.

It should be noted that configuring the number of bits occupied by TRS burst information with a granularity of SCell is independently configuring the number of bits occupied by the TRS burst information for each of different SCells. The numbers of bits occupied by TRS burst information corresponding to different SCells may be different.

It should be noted that configuring the number of bits occupied by TRS burst information with a granularity of terminal device is independently configuring the number of bits occupied by the TRS burst information for each of different terminal devices. The numbers of bits occupied by the TRS burst information corresponding to different terminal devices may be different.

Furthermore, in some alternative implementations, in a case where the second configuration information is used for configuring the number of bits occupied by the TRS burst information with the granularity of terminal device, there are two configuration modes as follows.

In an explicit configuration mode, the second configuration information includes second indication information for indicating the number of bits occupied by the TRS burst information corresponding to the terminal device.

Or, in an implicit configuration mode, the second configuration information includes at least one TRS burst information configured for the terminal device, where a number of the at least one TRS burst is used for determining the number of bits occupied by the TRS burst information corresponding to the terminal device.

The Length of TRS Offset Information

In the embodiments of the present disclosure, the number of bits occupied by the TRS offset information is fixed; or the number of bits occupied by the TRS offset information is variable.

In option 3-1), in some alternative implementations, in a case where the number of bits occupied by the TRS offset information is fixed, the number of bits occupied by the TRS offset information is determined based on a number of TRS offsets supported by a fourth SCell among the multiple SCells, where the fourth SCell is an SCell supporting a maximum number of TRS offsets among the multiple SCells.

In option 3-2), in some alternative implementations, in a case where the number of bits occupied by the TRS offset information is variable, the number of bits occupied by the TRS offset information is determined based on third configuration information sent by the network device.

In the above scheme, optionally, the third configuration information is used for configuring the number of bits occupied by the TRS offset information with a granularity of SCell; or the third configuration information is used for configuring the number of bits occupied by the TRS offset information with a granularity of terminal device.

It should be noted that configuring the number of bits occupied by TRS offset information with a granularity of SCell is independently configuring the number of bits occupied by the TRS offset information for each of different SCells. The numbers of bits occupied by the TRS offset information corresponding to different SCells may be different.

It should be noted that configuring the number of bits occupied by TRS offset information with a granularity of terminal device is independently configuring the number of bits occupied by the TRS offset information for each of different terminal devices. The numbers of bits occupied by the TRS offset information corresponding to different terminal devices may be different.

Furthermore, in some alternative implementations, in a case where the third configuration information is used for configuring the number of bits occupied by the TRS offset information with the granularity of terminal device, there are two configuration modes as follows.

In an explicit configuration mode, the third configuration information includes third indication information for indicating the number of bits occupied by the TRS offset information corresponding to the terminal device.

Or, in an implicit configuration mode, the third configuration information includes at least one TRS offset information configured for the terminal device, where a number of the at least one TRS offset is used for determining the number of bits occupied by the TRS offset information corresponding to the terminal device.

In the technical scheme of the embodiment of the present disclosure, the first MAC CE is associated with a first Logical Channel Identifier (LCID) for indicating a type of the first MAC CE. The first LCID is carried in an MAC sub-header corresponding to the first MAC CE. Herein, the first LCID may be a newly defined LCID or an existing LCID. Furthermore, if the first LCID is an existing LCID, the terminal device may determine the type of the first MAC CE in other manners, for example, the type of the first MAC CE may be determined by information carried in the first MAC CE.

The technical schemes of the embodiments of the present disclosure are illustrated with examples in combination with specific application examples.

First Application Example

Figure 7:
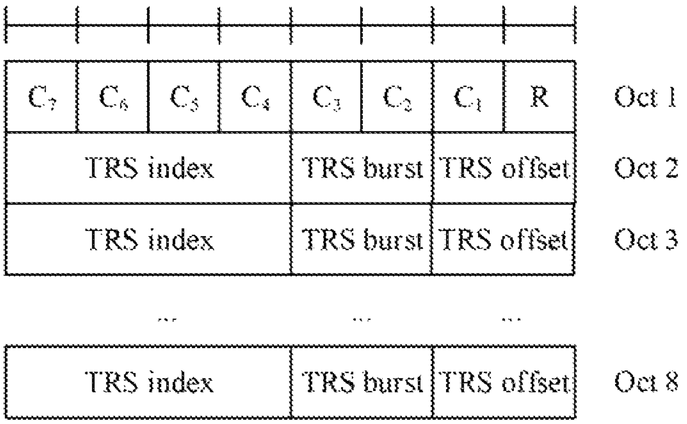
FIG. 7 is a first schematic diagram of a first MAC CE according to an embodiment of the present disclosure.

A terminal device receives a first MAC CE sent by a network device, and the first MAC CE includes first information and second information. The first information is used for indicating whether each of the multiple SCells is to be activated or deactivated, and description is made by taking the multiple SCells including 7 SCells as an example. The second information is used for indicating, for each to-be-activated SCell, whether the TRS of the SCell is to be activated. The format of the first MAC CE is shown in FIG. 7. The length of the first information is 1 byte (i.e. Otc1), and the length of the second information is 8 bytes (i.e. Otc2 to Otc8). It should be noted that the length of the second information is variable, and the length of the second information is associated with the number of to-be-activated SCells indicated by the first information.

1) The terminal device determines to-be-activated SCells and/or to-be-deactivated SCells according to the $C_i$ field of the first information. For example, C5=1, C3=1, C1=1, it respectively represents that SCells with the SCell indexes of 5, 3, 1 are to be activated. 2) For each to-be-activated SCell, the terminal device determines whether the TRS of the SCell is to be activated according to the TRS index in the TRS information corresponding to the to-be-activated SCell in the second information. If the value of the TRS index is 0, it represents that the TRS of the SCell is not to be activated. In this case, the terminal device ignores the values of the TRS burst field and the TRS offset field after the TRS index.

The second information includes one or more pieces of TRS information. The one or more pieces of TRS information sequentially correspond to SCell indexes for which Ci has a value of 1. It can be appreciated that the number of pieces of TRS information is the same as the number of to-be-activated SCells.

In the above scheme, each TRS information may include: a TRS index, TRS burst information and TRS offset information. Optionally, each TRS information may include a TRS index.

In the above scheme, for the TRS index, the TRS burst information and the TRS offset information, the network device may configure multiple candidate values for the terminal device through RRC signaling, and when the TRS is to be activated, the network device indicates one of the multiple candidate values to the terminal device through the first MAC CE.

Second Application Example

A terminal device receives a first MAC CE sent by a network device, and the first MAC CE includes first information and second information. The first information is used for indicating whether each of the multiple SCells is to be activated or deactivated, and description is made by taking the multiple SCells including 7 SCells as an example. The second information is used for indicating, for each to-be-activated SCell, whether the TRS of the SCell is to be activated. The format of the first MAC CE is shown in FIG. 8. The length of the first information is 1 byte (i.e. Otc1), and the length of the second information is 3 bytes (i.e. Otc2 to Otc4). It should be noted that the length of the second information is variable, and the length of the second information is associated with the number of to-be-activated SCells indicated by the first information.

1) The terminal device determines to-be-activated SCells and/or to-be-deactivated SCells according to the Ci field of the first information. For example, C5=1, C3=1, C1=1, it respectively represents that SCells with the SCell indexes of 5, 3, 1 are to be activated. 2) For each to-be-activated SCell, the terminal device determines whether the TRS of the SCell is to be activated according to the TRS index in the TRS information corresponding to the to-be-activated SCell in the second information. If the value of the TRS index is 0, it represents that the TRS of the SCell is not to be activated. In this case, there are no TRS burst field and TRS offset field after the TRS index. If the value of the TRS index is not 0, it represents that the TRS of the SCell is to be activated. In this case, There are the TRS burst field and the TRS offset field after the TRS index.

The second information includes one or more pieces of TRS information. The one or more pieces of TRS information sequentially correspond to SCell indexes for which Ci has a value of 1. It can be appreciated that the number of pieces of TRS information is the same as the number of to-be-activated SCells.

In the above scheme, each TRS information may include only the TRS index (the value of the TRS index is 0). Alternatively, each TRS information may include the TRS index (the value of the TRS index is not 0), TRS burst information and TRS offset information.

In the above scheme, for the TRS index, the TRS burst information and the TRS offset information, the network device may configure multiple candidate values for the terminal device through RRC signaling, and when the TRS is to be activated, the network device indicates one of the multiple candidate values to the terminal device through the first MAC CE.

Third Application Example

A terminal device receives a first MAC CE sent by a network device, and the first MAC CE includes first information and second information. The first information is used for indicating whether each of the multiple SCells is to be activated or deactivated, and description is made by taking the multiple SCells including 7 SCells as an example. The second information is used for indicating, for each SCell, whether the TRS of the SCell is to be activated. The format of the first MAC CE is shown in FIG. 9. The length of the first information is 1 byte (i.e. Otc1), and the length of the second information is 1 byte (i.e. Otc2). Furthermore, the first MAC CE further includes fourth information for indicating, for each target SCell (i.e. a to-be-activated SCell of which the TRS is to be activated), the TRS information of the target SCell. It should be noted that the length of the fourth information is variable, and the length of the fourth information is associated with the number of target SCells. The length of the fourth information in FIG. 9 is 2 bytes (i.e., Otc3 and Otc4).

1) The terminal device determines to-be-activated SCells and/or to-be-deactivated SCells and whether the TRS of the SCell is to be activated according to the Ci field of the first information and $C_i'$ field of the second information. For example, if Ci=1 and $C_i'=1$, it represents that an SCell with the SCell index of i is to be activated and the TRS of the SCell is to be activated. If Ci=1 and $C_i'=0$, it represents that the SCell with the SCell index of i is to be activated but the TRS of the SCell is not to be activated. If Ci=0, it represents that the SCell with the SCell index of i is to be deactivated and the terminal device ignores the corresponding $C_i'$. 2) For each to-be-activated SCell of which the TRS is to be activated, the terminal device reads the fourth information and determines the TRS information corresponding to the SCell. Herein, the value of the TRS index in the TRS information cannot be 0.

The fourth information includes one or more pieces of TRS information. The one or more pieces of TRS information sequentially correspond to SCell indexes for which Ci has a value of 1 and $C_i'$ has a value of 1.

In the above scheme, each TRS information may include only the TRS index. Alternatively, each TRS information may include the TRS index, TRS burst information and TRS offset information. The value of the TRS index cannot be 0.

In the above scheme, for the TRS index, the TRS burst information and the TRS offset information, the network device may configure multiple candidate values for the terminal device through RRC signaling, and when the TRS is to be activated, the network device indicates one of the multiple candidate values to the terminal device through the first MAC CE.

Fourth Application Example

Figure 10:
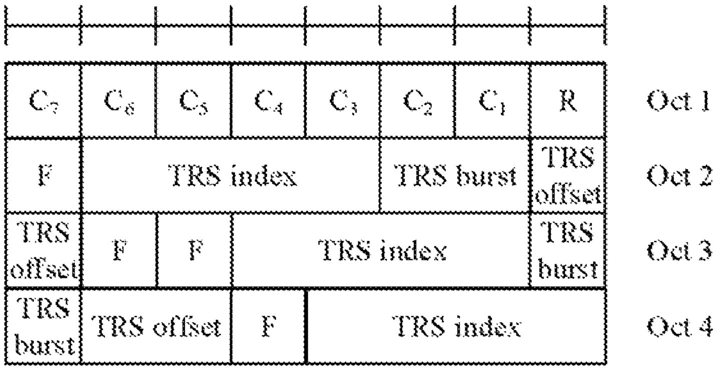
FIG. 10 is a fourth schematic diagram of a first MAC CE according to an embodiment of the present disclosure.

A terminal device receives a first MAC CE sent by a network device, and the first MAC CE includes first information and second information. The first information is used for indicating whether each of the multiple SCells is to be activated or deactivated, and description is made by taking the multiple SCells including 7 SCells as an example. The second information is used for indicating, for each to-be-activated SCell, whether the TRS of the SCell is to be activated. The format of the first MAC CE is shown in FIG. 10. The length of the first information is 1 byte (i.e. Otc1), and the length of the second information is 3 bytes (i.e. Otc2 to Otc4). It should be noted that the length of the second information is variable, and the length of the second information is associated with the number of to-be-activated SCells indicated by the first information.

1) The terminal device determines to-be-activated SCells and/or to-be-deactivated SCells according to the $C_i$ field of the first information. For example, C7=1, C5=1, C3=1, C1=1, it respectively represents that SCells with SCell indexes of 7, 5, 3, 1 are to be activated. 2) For each to-be-activated SCell, the terminal device determines whether the TRS of the SCell is to be activated according to a value of an F parameter in the TRS information corresponding to the to-be-activated SCell in the second information. If the value of the F parameter is 0, it represents that the TRS of the SCell is not to be activated. In this case, there are no TRS index field, TRS burst field and TRS offset field after the F parameter. If the value of the F parameter is 1, it represents that the TRS of the SCell is to be activated. In this case, there are the TRS index field, the TRS burst field and the TRS offset field after the F parameter.

The second information includes one or more pieces of TRS information. The one or more pieces of TRS information sequentially correspond to SCell indexes for which Ci has a value of 1. It can be appreciated that the number of pieces of TRS information is the same as the number of to-be-activated SCells.

In the above scheme, each TRS information may include only the F parameter (the value of the F parameter is 0). Alternatively, each TRS information may include the F parameter (the value of the F parameter is 1), a TRS index, TRS burst information, and TRS offset information.

In the above scheme, for the TRS index, the TRS burst information and the TRS offset information, the network device may configure multiple candidate values for the terminal device through RRC signaling, and when the TRS is to be activated, the network device indicates one of the multiple candidate values to the terminal device through the first MAC CE.

Fifth Application Example

Figure 11:
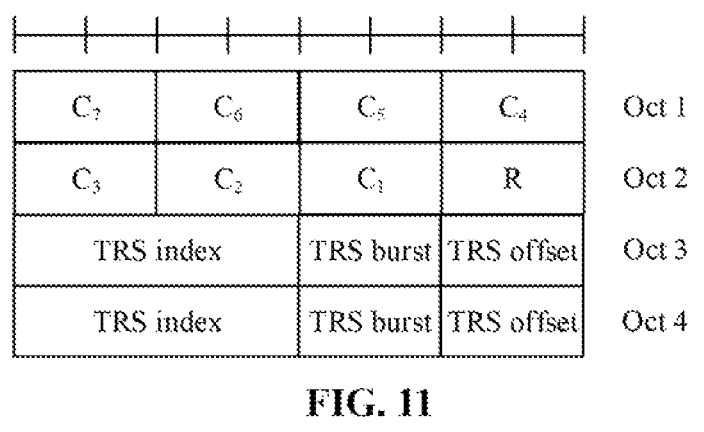

A terminal device receives a first MAC CE sent by a network device, and the first MAC CE includes third information. The third information is used for indicating whether each of the multiple SCells is to be activated or deactivated, and/or indicating whether the TRS of the SCell is to be activated. Herein, description is made by taking the multiple SCells including 7 SCells as an example. The format of the first MAC CE is shown in FIG. 11, and the length of the third information is 2 bytes (i.e. Otc1 and Otc2). Furthermore, the first MAC CE further includes fourth information for indicating, for each target SCell (i.e. a to-be-activated SCell of which the TRS is to be activated), the TRS information of the target SCell. It should be noted that the length of the fourth information is variable, and the length of the fourth information is associated with the number of target SCells. The length of the fourth information in FIG. 11 is 2 bytes (i.e., Otc3 and Otc4).

1) The terminal device determines to-be-activated SCells and/or to-be-deactivated SCells and whether the TRS of the SCell is to be activated according to the Ci field of the third information. For example, if Ci=00, it represents that the SCell with the SCell index of i is to be deactivated. If Ci=01, it represents that the SCell with the SCell index of i is to be activated but the TRS of the SCell is not to be activated. If $C_i$=10, it represents that the SCell with the SCell index of i is to be activated and the TRS of the SCell is to be activated. 2) For each to-be-activated SCell of which the TRS is to be activated, the terminal device reads the fourth information and determines the TRS information corresponding to the SCell. Herein, the value of the TRS index in the TRS information cannot be 0.

The fourth information includes one or more pieces of TRS information. The one or more pieces of TRS information sequentially correspond to SCell indexes for which Ci has a value of 10.

In the above scheme, each TRS information may include only the TRS index. Alternatively, TRS information may include the TRS index, TRS burst information and TRS offset information. The value of the TRS index cannot be 0.

In the above scheme, for the TRS index, the TRS burst information and the TRS offset information, the network device may configure multiple candidate values for the terminal device through RRC signaling, and when the TRS is to be activated, the network device indicates one of the multiple candidate values to the terminal device through the first MAC CE.

Sixth Application Example

Figure 12:
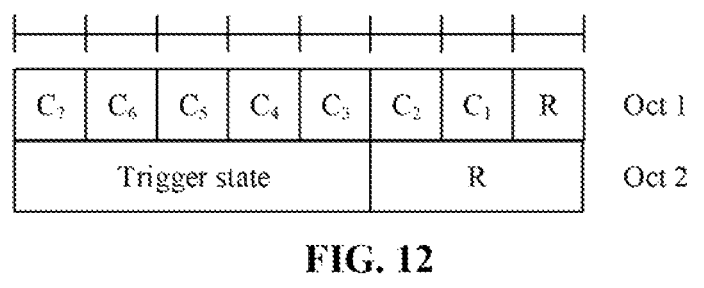

A terminal device receives a first MAC CE sent by a network device, and the first MAC CE includes first information and second information. The first information is used for indicating whether each of the multiple SCells is to be activated or deactivated, and description is made by taking the multiple SCells including 7 SCells as an example. The second information is used for indicating one or more trigger states, and one trigger state is described as an example. Each trigger state is associated with the TRSs of one or more SCells, and the activation of the TRSs of the one or more SCells associated with the trigger state is indirectly indicated by indicating the trigger state through the second information. The format of the first MAC CE is shown in FIG. 12. The length of the first information is 1 byte (i.e. Otc1), and the length of the second information is 1 byte (i.e. Otc2). It should be noted that the length of the second information is variable, and the length of the second information is associated with the number of trigger states to be indicated.

1) The terminal device determines to-be-activated SCells and/or to-be-deactivated SCells according to the $C_i$ field of the first information. For example, C7=1, C5=1, C3=1, C1=1, it respectively represents that SCells with SCell indexes of 7, 5, 3, 1 are to be activated. 2) According to the trigger state indicated by the second information, the terminal device determines that the TRSs of the SCells with SCell indexes of 7, 5 associated with the trigger state are to be activated. 2) The terminal device may also determine, according to the second information, the TRS configurations of the SCells with SCell indexes of 7, 5 associated with the trigger state.

Seventh Application Example

The length of each field (such as a TRS index field, a TRS burst field, and a TRS offset field) of the TRS information may be determined by the terminal device in the following manners. Hereinafter, the field may be called as the target field for ease of description.

First Manner

The length of the target field is fixed.

Taking the TRS index field as an example, for 7 SCells, the number of supported TRS configurations is 6, 8, 1, 4, 6, 10 and 14 respectively. In order to ensure that the first MAC CE can be used for indicating the number of TRS configurations supported by all SCells, the number of bits occupied by the TRS index field is 4, i.e., supporting up to 15 TRS indexes The number of bits occupied by the TRS burst field and the TRS offset field are determined in the same manner.

Second Manner

The length of the target field is variable. For different SCells and/or different terminal devices, the network device may pre-configure the length of the target field through the RRC message.

As an implementation, different SCells correspond to different lengths of the target fields. For example, the lengths of the three fields of an SCell with the SCell index of 1 are configured to be 4 bits, 2 bits, and 2 bits, respectively. The lengths of the three fields of an SCell with the SCell index of 2 are configured to be 2 bits, 1 bit, and 1 bit, respectively. Once the length of the target field corresponding to each SCell is determined, the lengths of the target fields of all terminal devices corresponding to a same SCell are the same.

As another implementation, different terminal devices correspond to different lengths of the target fields. For example, for a terminal device #1 and the SCell with the SCell index of 1, the lengths of the three fields are 4 bits, 2 bits and 2 bits, respectively. For a terminal device #2 and the SCell with the SCell index of 1, the lengths of the three fields are 2 bits, 1 bit, and 1 bit, respectively. The configuration information for configuring the lengths of the target fields may be explicitly configured through the RRC message, or implicitly determined according to the number of TRS candidate configurations. For example, if the network device configures 12 TRS configurations, 4 TRS bursts and 3 TRS offsets for the terminal device, respectively, accordingly, the lengths of the three fields are 4 bits, 2 bits and 2 bits, respectively.

It should be noted that in the technical schemes of the embodiments of the present disclosure, the lengths of the TRS index, the TRS burst and the TRS offset are all greater than or equal to 1 bit, and the present disclosure does not limit the specific number of the bits.

It should be noted that in the technical schemes of the embodiments of the present disclosure, although the three fields of TRS index, TRS burst and TRS offset are arranged in the order from higher bit to lower bit, the present disclosure does not limit the arrangement order of the three fields and the positions of the three fields.

It should be noted that in the technical schemes of the embodiments of the present disclosure, R bits may exist in the first MAC CE, and the number and position of R bits are not limited in the present disclosure.

It should be noted that in the technical schemes of the embodiments of the present disclosure, the maximum number of the SCells indicated by the first MAC CE is not limited.

It should be noted that in the technical schemes of the embodiments of the present disclosure, the TRS burst information and the TRS offset information may be contained or may not be contained in the TRS configuration. If the TRS burst information and the TRS offset information are contained in the TRS configuration, the first MAC CE may not contain the TRS burst field and the TRS offset field.

Preferred embodiments of the present disclosure have been described in detail with reference to the accompanying drawings, but the present disclosure is not limited to the specific details of the above embodiments. Within the scope of the technical conception of the present disclosure, various simple modifications may be made to the technical scheme of the present disclosure, and these simple modifications all fall within the scope of protection of the present disclosure. For example, each of the specific technical features described in the above specific embodiments may be combined in any suitable manner without contradiction, and various possible combinations are not further described in this disclosure in order to avoid unnecessary repetition. For another example, any combination may be made between the various embodiments of the present disclosure so long as it does not depart from the idea of the present disclosure and is also to be regarded as the present disclosure of the present disclosure. For another example, on the premise of no conflict, each embodiment described in the present disclosure and/or the technical features in each embodiment may be arbitrarily combined with the prior art, and the technical scheme obtained after the combination should also fall within the scope of protection of the present disclosure.

It should be understood that, in various embodiments of the present disclosure, the sequence numbers of the above processes do not imply the sequence of execution, and the sequence of execution of each process should be determined according to its functions and internal logic, and should not constitute any limitation on the implementation process of the embodiments of the present disclosure. Furthermore, in embodiments of the present disclosure, the terms "downlink", "uplink" and "sidelink" are used to represent the transmission direction of the signal or data, where the term "downlink" is used to represent a transmission direction of the signal or data as a first direction transmitted from a site to the user equipment of the cell, the term "uplink" is used to represent a transmission direction of the signal or data as a second direction transmitted from the user equipment of the cell to the site, and the term "sidelink" is used to represent a transmission direction of the signal or data as a first direction transmitted from the user equipment 1 to the user equipment 2. For example, a term "downlink signal" means that the transmission direction of the signal is a first direction. In addition, in embodiments of the present disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the present disclosure generally indicates that the relationship between the associated objects is "or".

Figure 13:
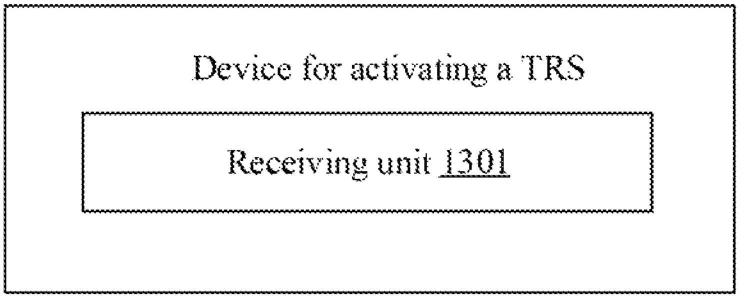
FIG. 13 is a first schematic structural diagram of a device for activating a TRS according to an embodiment of the present disclosure.

FIG. 13 is a first schematic structural diagram of a device for activating a TRS according to an embodiment of the present disclosure, and the device for activating a TRS is applied to a terminal device. As shown in FIG. 13, the device for activating a TRS includes a receiving unit 1301.

The receiving unit 1301 is configured to receive a first MAC CE sent by a network device, where the first MAC CE is used for indicating whether each of multiple SCells is to be activated or deactivated, and indicating whether TRSs of at least part of the multiple SCells are to be activated.

In some alternative implementations, the first MAC CE carries first information and second information, where the first information is used for indicating whether each of the multiple SCells is to be activated or deactivated and the second information is used for indicating whether the TRSs of the at least part of the multiple SCells are to be activated.

In some alternative implementations, at least one first SCell of the multiple SCells is to be activated through indication of the first information, and the second information is used for indicating whether a TRS of the at least one first SCell is to be activated.

The second information includes TRS information corresponding to each of the at least one first SCell, where the TRS information is used for indicating whether a TRS of a first SCell corresponding to the TRS information is to be activated.

In some alternative implementations, the TRS information includes a TRS index, a value of the TRS index being used for indicating whether the TRS is to be activated.

In some alternative implementations, when the value of the TRS index is a first value, the TRS index is used for indicating that the TRS is not to be activated; and when the value of the TRS index is not the first value, the TRS index is used for indicating that the TRS is to be activated.

In some alternative implementations, the TRS index is further used for indicating a TRS configuration in a case where the value of the TRS index is not the first value.

In some alternative implementations, the TRS information further includes at least one of TRS burst information or TRS offset information.

In some alternative implementations, the TRS information includes only the TRS index in a case where the value of the TRS index is the first value; and the TRS information further includes at least one of TRS burst information or TRS offset information in a case where the value of the TRS index is not the first value.

In some alternative implementations, the TRS information includes a first parameter, a value of the first parameter being used for indicating whether the TRS is to be activated.

In some alternative implementations, when the value of the first parameter is a first value, the first parameter is used for indicating that the TRS is not to be activated; and when the value of the first parameter is a second value, the first parameter is used for indicating that the TRS is to be activated.

In some alternative implementations, the TRS information includes only the first parameter in a case where the value of the first parameter is the first value; and the TRS information further includes at least one of a TRS index, TRS burst information or TRS offset information in a case where the value of the first parameter is the second value.

In some alternative implementations, the TRS information in the second information in an order from front to back corresponds to the at least one first SCell in an ascending order of SCell indexes; or the TRS information in the second information in the order from front to back corresponds to the at least one first SCell in a descending order of SCell indexes.

In some alternative implementations, the second information is used for indicating whether TRSs of all of the multiple SCells are to be activated.

The second information including TRS indication information corresponding to each of the multiple SCells, where the TRS indication information is used for indicating whether a TRS of an SCell corresponding to the TRS indication information is to be activated.

In some alternative implementations, the TRS indication information in the second information in an order from lower bit to higher bit of bits occupied by the TRS indication information corresponds to the multiple SCells in an ascending order of SCell indexes; or the TRS indication information in the second information in the order from lower bit to higher bit of the bits occupied by the TRS indication information corresponds to the multiple SCells in a descending order of SCell indexes.

In some alternative implementations, the first MAC CE carries third information for indicating at least one of: whether each of the multiple SCells is to be activated or deactivated, or whether a TRS of the SCell is to be activated.

In some alternative implementations, the third information includes N bits, each M bits among the N bits corresponds to one SCell, a value of the M bits is used for indicating whether the SCell corresponding to the M bits is to be activated or deactivated, or whether a TRS of the SCell is to be activated, where N and M are positive integers.

In some alternative implementations, when a value of the M bits is a first value, the M bits are used for indicating that the SCell corresponding to the M bits is to be deactivated;

when a value of the M bits is a second value, the M bits are used for indicating that the SCell corresponding to the M bits is to be activated and the TRS of the SCell is not to be activated; and when a value of the M bits is a third value, the M bits are used for indicating that the SCell corresponding to the M bits is to be activated and the TRS of the SCell is to be activated.

In some alternative implementations, the first MAC CE further carries fourth information including TRS information corresponding to each of at least one target SCell, where the target SCell is a to-be-activated SCell of which the TRS is to be activated.

In some alternative implementations, the TRS information includes at least one of: a TRS index, TRS burst information, or TRS offset information.

In some alternative implementations, the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

In some alternative implementations, the number of bits occupied by the TRS index is fixed; or the number of bits occupied by the TRS index is variable.

In some alternative implementations, in a case where the number of bits occupied by the TRS index is fixed, the number of bits occupied by the TRS index is determined based on a number of TRS configurations supported by a second SCell among the multiple SCells, where the second SCell is an SCell supporting a maximum number of TRS configurations among the multiple SCells.

In some alternative implementations, in a case where the number of bits occupied by the TRS index is variable, the number of bits occupied by the TRS index is determined based on first configuration information sent by the network device.

In some alternative implementations, the first configuration information is used for configuring the number of bits occupied by the TRS index with a granularity of SCell; or the first configuration information is used for configuring the number of bits occupied by the TRS index with a granularity of terminal device.

In some alternative implementations, in a case where the first configuration information is used for configuring the number of bits occupied by the TRS index with the granularity of terminal device, the first configuration information includes first indication information for indicating the number of bits occupied by the TRS index corresponding to the terminal device; or the first configuration information includes at least one TRS configuration configured for the terminal device, where a number of the at least one TRS configuration is used for determining the number of bits occupied by the TRS index corresponding to the terminal device.

In some alternative implementations, the number of bits occupied by the TRS burst information is fixed; or the number of bits occupied by the TRS burst information is variable.

In some alternative implementations, in a case where the number of bits occupied by the TRS burst information is fixed, the number of bits occupied by the TRS burst information is determined based on a number of TRS bursts supported by a third SCell among the multiple SCells, where the third SCell is an SCell supporting a maximum number of TRS bursts among the multiple SCells.

In some alternative implementations, in a case where the number of bits occupied by the TRS burst information is variable, the number of bits occupied by the TRS burst information is determined based on second configuration information sent by the network device.

In some alternative implementations, the second configuration information is used for configuring the number of bits occupied by the TRS burst information with a granularity of SCell; or the second configuration information is used for configuring the number of bits occupied by the TRS burst information with a granularity of terminal device.

In some alternative implementations, in a case where the second configuration information is used for configuring the number of bits occupied by the TRS burst information with the granularity of terminal device, the second configuration information includes second indication information for indicating the number of bits occupied by the TRS burst information corresponding to the terminal device; or the second configuration information includes at least one TRS burst information configured for the terminal device, where a number of the at least one TRS burst is used for determining the number of bits occupied by the TRS burst information corresponding to the terminal device.

In some alternative implementations, the number of bits occupied by the TRS offset information is fixed; or the number of bits occupied by the TRS offset information is variable.

In some alternative implementations, in a case where the number of bits occupied by the TRS offset information is fixed, the number of bits occupied by the TRS offset information is determined based on a number of TRS offsets supported by a fourth SCell among the multiple SCells, where the fourth SCell is an SCell supporting a maximum number of TRS offsets among the multiple SCells.

In some alternative implementations, in a case where the number of bits occupied by the TRS offset information is variable, the number of bits occupied by the TRS offset information is determined based on third configuration information sent by the network device.

In some alternative implementations, the third configuration information is used for configuring the number of bits occupied by the TRS offset information with a granularity of SCell; or the third configuration information is used for configuring the number of bits occupied by the TRS offset information with a granularity of terminal device.

In some alternative implementations, in a case where the third configuration information is used for configuring the number of bits occupied by the TRS offset information with the granularity of terminal device, the third configuration information includes third indication information for indicating the number of bits occupied by the TRS offset information corresponding to the terminal device; or the third configuration information includes at least one TRS offset information configured for the terminal device, where a number of the at least one TRS offset is used for determining the number of bits occupied by the TRS offset information corresponding to the terminal device.

In some alternative implementations, at least one first SCell of the multiple SCells is to be activated through indication of the first information.

The second information includes indication information of a first trigger state, the indication information of the first trigger state being used for indicating that TRSs of one or more first SCells associated with the first trigger state are to be activated.

In some alternative implementations, the indication information of the first trigger state is further used for indicating at least one of the following of the one or more first SCells associated with the first trigger state: TRS configurations, TRS burst information, or TRS offset information.

In some alternative implementations, the first MAC CE is associated with a first LCID for indicating a type of the first MAC CE.

In some alternative implementations, the first LCID is carried in an MAC sub-header corresponding to the first MAC CE.

Those skilled in the art will appreciate that the above-described description of the device for activating a TRS in the embodiment of the present disclosure may be understood with reference to the description of the method for activating a TRS in the embodiment of the present disclosure.

Figure 14:
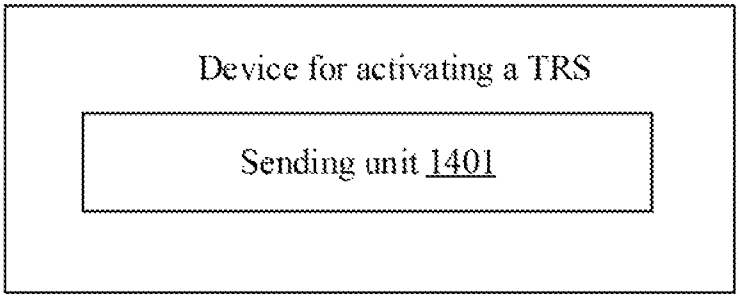
FIG. 14 is a second schematic structural diagram of a device for activating a TRS according to an embodiment of the present disclosure.

FIG. 14 is a second schematic structural diagram of a device for activating a TRS according to an embodiment of the present disclosure, and the device for activating a TRS is applied to a network device. As shown in FIG. 14, the device for activating a TRS includes a sending unit 1401.

The sending unit 1401 is configured to send a first MAC CE to a terminal device, where the first MAC CE is used for indicating whether each of multiple SCells is to be activated or deactivated, and indicating whether TRSs of at least part of the multiple SCells are to be activated.

In some alternative implementations, the first MAC CE carries first information and second information, where the first information is used for indicating whether each of the multiple SCells is to be activated or deactivated and the second information is used for indicating whether the TRSs of the at least part of the multiple SCells are to be activated.

In some alternative implementations, at least one first SCell of the multiple SCells is to be activated through indication of the first information, and the second information is used for indicating whether a TRS of the at least one first SCell is to be activated.

The second information includes TRS information corresponding to each of the at least one first SCell, where the TRS information is used for indicating whether a TRS of a first SCell corresponding to the TRS information is to be activated.

In some alternative implementations, the TRS information includes a TRS index, a value of the TRS index being used for indicating whether the TRS is to be activated.

In some alternative implementations, when the value of the TRS index is a first value, the TRS index is used for indicating that the TRS is not to be activated; and when the value of the TRS index is not the first value, the TRS index is used for indicating that the TRS is to be activated.

In some alternative implementations, the TRS index is further used for indicating a TRS configuration in a case where the value of the TRS index is not the first value.

In some alternative implementations, the TRS information further includes at least one of TRS burst information or TRS offset information.

In some alternative implementations, the TRS information includes only the TRS index in a case where the value of the TRS index is the first value; and the TRS information further includes at least one of TRS burst information or TRS offset information in a case where the value of the TRS index is not the first value.

In some alternative implementations, the TRS information includes a first parameter, a value of the first parameter being used for indicating whether the TRS is to be activated.

In some alternative implementations, when the value of the first parameter is a first value, the first parameter is used for indicating that the TRS is not to be activated; and when the value of the first parameter is a second value, the first parameter is used for indicating that the TRS is to be activated.

In some alternative implementations, the TRS information includes only the first parameter in a case where the value of the first parameter is the first value; and the TRS information further includes at least one of a TRS index, TRS burst information or TRS offset information in a case where the value of the first parameter is the second value.

In some alternative implementations, the TRS information in the second information in an order from front to back corresponds to the at least one first SCell in an ascending order of SCell indexes; or the TRS information in the second information in the order from front to back corresponds to the at least one first SCell in a descending order of SCell indexes.

In some alternative implementations, the second information is used for indicating whether TRSs of all of the multiple SCells are to be activated.

The second information including TRS indication information corresponding to each of the multiple SCells, where the TRS indication information is used for indicating whether a TRS of an SCell corresponding to the TRS indication information is to be activated.

In some alternative implementations, the TRS indication information in the second information in an order from lower bit to higher bit of bits occupied by the TRS indication information corresponds to the multiple SCells in an ascending order of SCell indexes; or the TRS indication information in the second information in the order from lower bit to higher bit of the bits occupied by the TRS indication information corresponds to the multiple SCells in a descending order of SCell indexes.

In some alternative implementations, the first MAC CE carries third information for indicating at least one of: whether each of the multiple SCells is to be activated or deactivated, or whether a TRS of the SCell is to be activated.

In some alternative implementations, the third information includes N bits, each M bits among the N bits corresponds to one SCell, a value of the M bits is used for indicating whether the SCell corresponding to the M bits is to be activated or deactivated, or whether a TRS of the SCell is to be activated, where N and M are positive integers.

In some alternative implementations, when a value of the M bits is a first value, the M bits are used for indicating that the SCell corresponding to the M bits is to be deactivated;

when a value of the M bits is a second value, the M bits are used for indicating that the SCell corresponding to the M bits is to be activated and the TRS of the SCell is not to be activated; and when a value of the M bits is a third value, the M bits are used for indicating that the SCell corresponding to the M bits is to be activated and the TRS of the SCell is to be activated.

In some alternative implementations, the first MAC CE further carries fourth information including TRS information corresponding to each of at least one target SCell, where the target SCell is a to-be-activated SCell of which the TRS is to be activated.

In some alternative implementations, the TRS information includes at least one of: a TRS index, TRS burst information, or TRS offset information.

In some alternative implementations, the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

In some alternative implementations, the number of bits occupied by the TRS index is fixed; or the number of bits occupied by the TRS index is variable.

In some alternative implementations, in a case where the number of bits occupied by the TRS index is fixed, the number of bits occupied by the TRS index is determined based on a number of TRS configurations supported by a second SCell among the multiple SCells, where the second SCell is an SCell supporting a maximum number of TRS configurations among the multiple SCells.

In some alternative implementations, in a case where the number of bits occupied by the TRS index is variable, the number of bits occupied by the TRS index is determined based on first configuration information sent by the network device.

In some alternative implementations, the first configuration information is used for configuring the number of bits occupied by the TRS index with a granularity of SCell; or the first configuration information is used for configuring the number of bits occupied by the TRS index with a granularity of terminal device.

In some alternative implementations, in a case where the first configuration information is used for configuring the number of bits occupied by the TRS index with the granularity of terminal device, the first configuration information includes first indication information for indicating the number of bits occupied by the TRS index corresponding to the terminal device; or the first configuration information includes at least one TRS configuration configured for the terminal device, where a number of the at least one TRS configuration is used for determining the number of bits occupied by the TRS index corresponding to the terminal device.

In some alternative implementations, the number of bits occupied by the TRS burst information is fixed; or the number of bits occupied by the TRS burst information is variable.

In some alternative implementations, in a case where the number of bits occupied by the TRS burst information is fixed, the number of bits occupied by the TRS burst information is determined based on a number of TRS bursts supported by a third SCell among the multiple SCells, where the third SCell is an SCell supporting a maximum number of TRS bursts among the multiple SCells.

In some alternative implementations, in a case where the number of bits occupied by the TRS burst information is variable, the number of bits occupied by the TRS burst information is determined based on second configuration information sent by the network device.

In some alternative implementations, the second configuration information is used for configuring the number of bits occupied by the TRS burst information with a granularity of SCell; or the second configuration information is used for configuring the number of bits occupied by the TRS burst information with a granularity of terminal device.

In some alternative implementations, in a case where the second configuration information is used for configuring the number of bits occupied by the TRS burst information with the granularity of terminal device, the second configuration information includes second indication information for indicating the number of bits occupied by the TRS burst information corresponding to the terminal device; or the second configuration information includes at least one TRS burst information configured for the terminal device, where a number of the at least one TRS burst is used for determining the number of bits occupied by the TRS burst information corresponding to the terminal device.

In some alternative implementations, the number of bits occupied by the TRS offset information is fixed; or the number of bits occupied by the TRS offset information is variable.

In some alternative implementations, in a case where the number of bits occupied by the TRS offset information is fixed, the number of bits occupied by the TRS offset information is determined based on a number of TRS offsets supported by a fourth SCell among the multiple SCells, where the fourth SCell is an SCell supporting a maximum number of TRS offsets among the multiple SCells.

In some alternative implementations, in a case where the number of bits occupied by the TRS offset information is variable, the number of bits occupied by the TRS offset information is determined based on third configuration information sent by the network device.

In some alternative implementations, the third configuration information is used for configuring the number of bits occupied by the TRS offset information with a granularity of SCell; or the third configuration information is used for configuring the number of bits occupied by the TRS offset information with a granularity of terminal device.

In some alternative implementations, in a case where the third configuration information is used for configuring the number of bits occupied by the TRS offset information with the granularity of terminal device, the third configuration information includes third indication information for indicating the number of bits occupied by the TRS offset information corresponding to the terminal device; or the third configuration information includes at least one TRS offset information configured for the terminal device, where a number of the at least one TRS offset is used for determining the number of bits occupied by the TRS offset information corresponding to the terminal device.

In some alternative implementations, at least one first SCell of the multiple SCells is to be activated through indication of the first information.

The second information includes indication information of a first trigger state, the indication information of the first trigger state being used for indicating that TRSs of one or more first SCells associated with the first trigger state are to be activated.

In some alternative implementations, the indication information of the first trigger state is further used for indicating at least one of the following of the one or more first SCells associated with the first trigger state: TRS configurations, TRS burst information, or TRS offset information.

In some alternative implementations, the first MAC CE is associated with a first LCID for indicating a type of the first MAC CE.

In some alternative implementations, the first LCID is carried in an MAC sub-header corresponding to the first MAC CE.

Those skilled in the art will appreciate that the above-described description of the device for activating a TRS in the embodiment of the present disclosure may be understood with reference to the description of the method for activating a TRS in the embodiment of the present disclosure.

Figure 15:
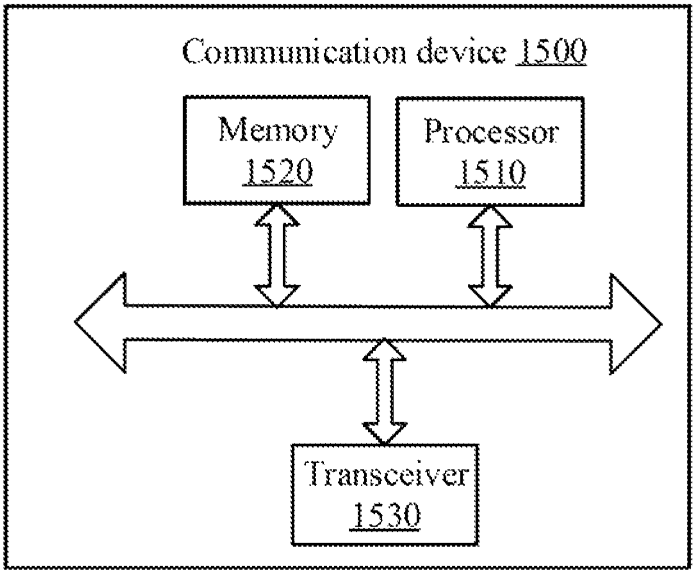
FIG. 15 is a schematic structural diagram of a communication device according to an embodiment of the present disclosure.

FIG. 15 is a schematic structural diagram of a communication device 1500 according to an embodiment of the present disclosure. The communication device may be a terminal device or a network device. The communication device 1500 shown in FIG. 15 includes a processor 1510 that may invoke and run a computer program from a memory to implement the method in the embodiment of the present disclosure.

Optionally, as shown in FIG. 15, the communication device 1500 may also include a memory 1520. The processor 1510 may invoke and run a computer program from the memory 1520 to implement the method in the embodiment of the present disclosure.

The memory 1520 may be a separate device independent of or the memory 1520 may be integrated into the processor 1510.

Optionally, as shown in FIG. 15, the communication device 1500 may also include a transceiver 1530. The processor 1510 may control the transceiver 1530 to communicate with other devices, in particular, to send information or data to other devices, or receive information or data sent by other devices.

The transceiver 1530 may include a transmitter and a receiver. The transceiver 1530 may further include an antenna(s), the number of which may be one or more.

Optionally, the communication device 1500 may be specifically a network device in the embodiments of the present disclosure, and the communication device 1500 may implement the corresponding process implemented by the network device in each method of the embodiments of the present disclosure, which will not be repeated herein for the sake of brevity.

Optionally, the communication device 1500 may be a mobile terminal/terminal device according to the embodiments of the present disclosure, and the communication device 1500 may implement the corresponding process implemented by the mobile terminal/terminal device in each method of the embodiments of the present disclosure, which will not be repeated herein for the sake of brevity.

Figure 16:
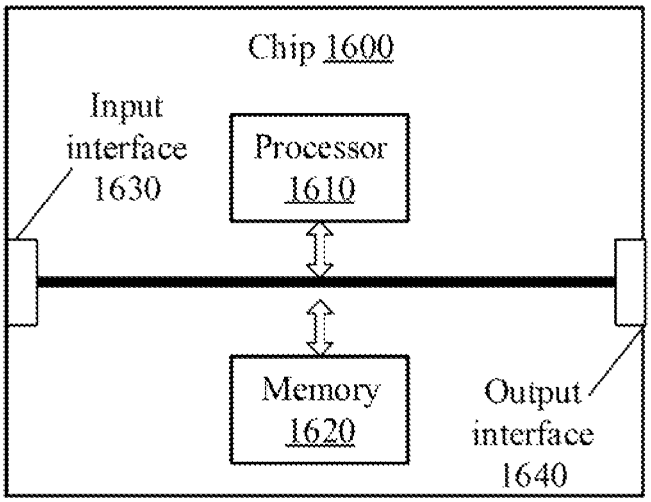
FIG. 16 is a schematic structural diagram of a chip according to an embodiment of the present disclosure.

FIG. 16 is a schematic structural diagram of a chip according to an embodiment of the present disclosure. The chip 1600 shown in FIG. 16 includes a processor 1610 that may invoke and run a computer program from a memory to implement the method in the embodiment of the present disclosure.

Optionally, as shown in FIG. 16, the chip 1600 may also include a memory 1620. The processor 1610 may invoke and run a computer program from the memory 1620 to implement the method in the embodiment of the present disclosure.

The memory 1620 may be a separate device independent of the processor 1610 or the memory 1620 may be integrated in the processor 1610.

Optionally, the chip 1600 may also include an input interface 1630. The processor 1610 may control the input interface 1630 to communicate with other devices or chips, and in particular may obtain information or data sent by other devices or chips.

Optionally, the chip 1600 may also include an output interface 1640. The processor 1610 may control the output interface 1640 to communicate with other devices or chips, and in particular may output information or data to other devices or chips.

Optionally, the chip may be applied to the network device in the embodiments of the present disclosure, and the chip may implement the corresponding process implemented by the network device in each method of the embodiments of the disclosure, which is not repeated herein for the sake of brevity.

Optionally, the chip may be applied to the mobile terminal/terminal device in the embodiments of the present disclosure, and the chip may implement the corresponding process implemented by the mobile terminal/terminal device in each method of the embodiment of the disclosure, which will not be repeated herein for the sake of brevity.

It should be understood that chips mentioned in the embodiments of the present disclosure may also be referred to as system level chips, system chips, chip systems or on-chip system chips, etc.

Figure 17:
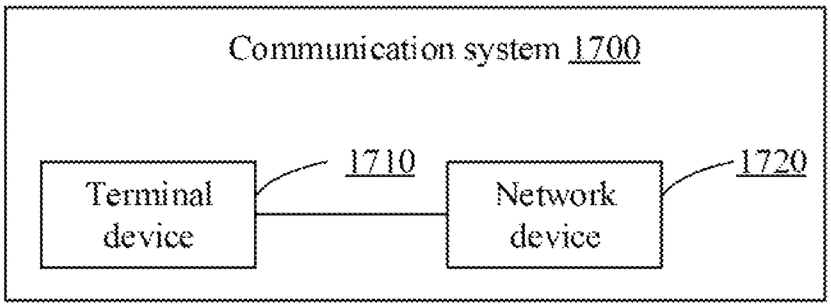
FIG. 17 is a schematic block diagram of a communication system according to an embodiment of the present disclosure.

FIG. 17 is a schematic block diagram of a communication system 1700 according to an embodiment of the present disclosure. As shown in FIG. 17, the communication system 1700 includes a terminal device 1710 and a network device 1720.

The terminal device 1710 may be configured to implement the corresponding functions implemented by the terminal device in the above method, and the network device 1720 may be configured to implement the corresponding functions implemented by the network device in the above method, which will not be repeated herein for the sake of brevity.

It should be understood that the processor of the embodiments of the disclosure may be an integrated circuit chip with signal processing capacity. In an implementation process, various steps of the above method embodiments may be completed by an integrated logic circuit of hardware in the processor or an instruction in the form of software. The above processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the disclosure may be implemented or performed. The general-purpose processor may be a microprocessor, any conventional processor, or the like. Steps of the methods disclosed with reference to the embodiments of the disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the disclosure may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a RAM, which is used as an external high-speed cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the disclosure are intended to include, but not limited to, these and any other suitable types of memories.

The embodiments of the disclosure further provide a computer-readable storage medium, which is configured to store a computer program.

Optionally, the computer-readable storage medium may be applied to a network device in the embodiments of the disclosure. The computer program enables a computer to execute corresponding flows implemented by the network device in each method of the embodiments of the disclosure, which will not be elaborated here for simplicity.

Optionally, the computer-readable storage medium may be applied to a mobile terminal/a terminal device in the embodiments of the disclosure. The computer program enables a computer to execute corresponding flows implemented by the mobile terminal/the terminal device in each method of the embodiments of the disclosure, which will not be elaborated here for simplicity.

The embodiments of the disclosure further provide a computer program product, which includes a computer program instruction.

Optionally, the computer program product may be applied to a network device in the embodiments of the disclosure. The computer program instruction enables a computer to execute corresponding flows implemented by the network device in each method of the embodiments of the disclosure, which will not be elaborated here for simplicity.

Optionally, the computer program product may be applied to a mobile terminal/a terminal device in the embodiments of the disclosure. The computer program instruction enables a computer to execute corresponding flows implemented by the mobile terminal/the terminal device in each method of the embodiments of the disclosure, which will not be elaborated here for simplicity.

The embodiments of the disclosure further provide a computer program.

Optionally, the computer program may be applied to a network device in the embodiments of the disclosure. The computer program runs in a computer to enable the computer to execute corresponding flows implemented by the network device in each method of the embodiments of the disclosure, which will not be elaborated here for simplicity.

Optionally, the computer program may be applied to a mobile terminal/a terminal device in the embodiments of the disclosure. When running on a computer, the computer program enables a computer to execute corresponding flows implemented by the mobile terminal/the terminal device in each method of the embodiments of the disclosure, which will not be elaborated here for simplicity.

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may realize the described functions for each particular disclosure by different methods, but it is not be considered that the implementation is beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. For example, the apparatus embodiment described above is only schematic, and for example, division of the units is only logic function division, and other division manners may be adopted during practical implementation. For example, a plurality of units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in various embodiments of the disclosure may be integrated into one processing unit, or each of the units may be physically separated, or two or more units may be integrated into one unit.

When the functions are realized in a form of a software functional unit and sold or used as an independent product, they may be stored in a computer-readable storage medium. Based on this understanding, the technical solutions of the embodiments of the disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the embodiments of the disclosure. The foregoing storage medium includes a USB flash disk, a mobile hard disk drive, a ROM, a RAM, and various media that can store program codes, such as a magnetic disk or an optical disk.

The above descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for activating a Temporary Reference Signal (TRS), comprising:

receiving, by a terminal device, a first Media Access Control (MAC) Control Element (CE) sent by a network device, wherein the first MAC CE carries first information and second information, wherein the first information is used for indicating whether each of a plurality of Serving Cells (SCells) is activated or deactivated, and the second information is used for indicating whether TRSs of at least part of the plurality of SCells are activated, wherein at least one first SCell of the plurality of SCells is activated through indication of the first information, and the second information is used for indicating whether a TRS of the at least one first SCell is activated, the second information comprises a TRS index corresponding to each of the at least one first SCell, wherein the TRS index is used for indicating whether a TRS of a first SCell corresponding to the TRS index is activated, wherein when the value of the TRS index is a first value, the TRS index is used for indicating that the TRS is not activated; and when the value of the TRS index is not the first value, the TRS index is used for indicating that the TRS is activated, wherein the TRS index is further used for indicating a TRS configuration in a case where the value of the TRS index is not the first value, and wherein the first information occupies 1 byte and is used for indicating whether each of the plurality of SCells is activated or deactivated.

2. The method of claim 1, the second information further comprises a first parameter, a value of the first parameter being used for indicating whether the TRS is activated, when the value of the first parameter is a first value, the first parameter is used for indicating that the TRS is not activated; and when the value of the first parameter is a second value, the first parameter is used for indicating that the TRS is activated, wherein the second information comprises only the first parameter in a case where the value of the first parameter is the first value; and the second information further comprises at least one of TRS burst information or TRS offset information in a case where the value of the first parameter is the second value.

3. The method of claim 1, wherein the first MAC CE further carries third information for indicating at least one of: whether each of the plurality of SCells is activated or deactivated, or whether a TRS of the SCell is activated, wherein the third information comprises N bits, each M bits among the N bits corresponds to one SCell, a value of the M bits is used for indicating whether the SCell corresponding to the M bits is activated or deactivated, or whether a TRS of the SCell is activated, where N and M are positive integers, wherein when a value of the M bits is a first value, the M bits are used for indicating that the SCell corresponding to the M bits is deactivated;

when a value of the M bits is a second value, the M bits are used for indicating that the SCell corresponding to the M bits is activated and the TRS of the SCell is not activated; and when a value of the M bits is a third value, the M bits are used for indicating that the SCell corresponding to the M bits is activated and the TRS of the SCell is activated.

4. The method of claim 1, wherein the first MAC CE further carries fourth information comprising TRS information corresponding to each of at least one target SCell, wherein the target SCell is an activated SCell of which the TRS is activated.

5. The method of claim 4, wherein the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

6. A method for activating a Temporary Reference Signal (TRS), comprising:

sending, by a network device, a first Media Access Control (MAC) Control Element (CE) to a terminal device, wherein the first MAC CE carries first information and second information, wherein the first information is used for indicating whether each of a plurality of Serving Cells (SCells) is activated or deactivated, and the second information is used for indicating whether TRSs of at least part of the plurality of SCells are activated, wherein at least one first SCell of the plurality of SCells is activated through indication of the first information, and the second information is used for indicating whether a TRS of the at least one first SCell is activated, the second information comprises a TRS index corresponding to each of the at least one first SCell, wherein the TRS index is used for indicating whether a TRS of a first SCell corresponding to the TRS index is activated, wherein when the value of the TRS index is a first value, the TRS index is used for indicating that the TRS is not activated; and when the value of the TRS index is not the first value, the TRS index is used for indicating that the TRS is activated, wherein the TRS index is further used for indicating a TRS configuration in a case where the value of the TRS index is not the first value, and wherein the first information occupies 1 byte and is used for indicating whether each of the plurality of SCells is activated or deactivated.

7. The method of claim 6, wherein the second information further comprises a first parameter, a value of the first parameter being used for indicating whether the TRS is activated, when the value of the first parameter is a first value, the first parameter is used for indicating that the TRS is not activated; and when the value of the first parameter is a second value, the first parameter is used for indicating that the TRS is activated, wherein the second information comprises only the first parameter in a case where the value of the first parameter is the first value; and the second information further comprises at least one of TRS burst information or TRS offset information in a case where the value of the first parameter is the second value.

8. The method of claim 6, wherein the first MAC CE further carries third information for indicating at least one of: whether each of the plurality of SCells is activated or deactivated, or whether a TRS of the SCell is activated, wherein the third information comprises N bits, each M bits among the N bits corresponds to one SCell, a value of the M bits is used for indicating whether the SCell corresponding to the M bits is activated or deactivated, or whether a TRS of the SCell is activated, where N and M are positive integers, wherein when a value of the M bits is a first value, the M bits are used for indicating that the SCell corresponding to the M bits is deactivated;

when a value of the M bits is a second value, the M bits are used for indicating that the SCell corresponding to the M bits is activated and the TRS of the SCell is not activated; and when a value of the M bits is a third value, the M bits are used for indicating that the SCell corresponding to the M bits is activated and the TRS of the SCell is activated.

9. The method of claim 6, wherein the first MAC CE further carries fourth information comprising TRS information corresponding to each of at least one target SCell, wherein the target SCell is an activated SCell of which the TRS is activated.

10. The method of claim 9, wherein the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

11. A terminal device, comprising:

a processor, and a memory configured to store a computer-executable instructions, wherein the processor is configured to invoke and run the computer-executable instructions stored in the memory to cause the terminal device to perform:

receiving a first Media Access Control (MAC) Control Element (CE) sent by a network device, wherein the first MAC CE carries first information and second information, wherein the first information is used for indicating whether each of a plurality of Serving Cells (SCells) is e activated or deactivated, and the second information is used for indicating whether Temporary Reference Signals (TRSs) of at least part of the plurality of SCells are activated, wherein at least one first SCell of the plurality of SCells is activated through indication of the first information, and the second information is used for indicating whether a TRS of the at least one first SCell is activated, the second information comprises a TRS index corresponding to each of the at least one first SCell, wherein the TRS index is used for indicating whether a TRS of a first SCell corresponding to the TRS index is activated, wherein when the value of the TRS index is a first value, the TRS index is used for indicating that the TRS is not activated; and when the value of the TRS index is not the first value, the TRS index is used for indicating that the TRS is activated, wherein the TRS index is further used for indicating a TRS configuration in a case where the value of the TRS index is not the first value, and wherein the first information occupies 1 byte and is used for indicating whether each of the plurality of SCells is activated or deactivated.

12. The terminal device of claim 11, wherein the first MAC CE further carries third information for indicating at least one of: whether each of the plurality of SCells is activated or deactivated, or whether a TRS of the SCell is activated, wherein the third information comprises N bits, each M bits among the N bits corresponds to one SCell, a value of the M bits is used for indicating whether the SCell corresponding to the M bits is activated or deactivated, or whether a TRS of the SCell is activated, where N and M are positive integers, wherein when a value of the M bits is a first value, the M bits are used for indicating that the SCell corresponding to the M bits is deactivated;

when a value of the M bits is a second value, the M bits are used for indicating that the SCell corresponding to the M bits is activated and the TRS of the SCell is not activated; and when a value of the M bits is a third value, the M bits are used for indicating that the SCell corresponding to the M bits is activated and the TRS of the SCell is activated.

13. The terminal device of claim 11, wherein the first MAC CE further carries fourth information comprising TRS information corresponding to each of at least one target SCell, wherein the target SCell is an activated SCell of the TRS is activated.

14. The terminal device of claim 13, wherein the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

15. The terminal device of claim 11, the second information further comprises a first parameter, a value of the first parameter being used for indicating whether the TRS is activated, when the value of the first parameter is a first value, the first parameter is used for indicating that the TRS is not activated; and when the value of the first parameter is a second value, the first parameter is used for indicating that the TRS is activated, wherein the second information comprises only the first parameter in a case where the value of the first parameter is the first value; and the second information further comprises at least one of TRS burst information or TRS offset information in a case where the value of the first parameter is the second value.

16. A network device, comprising:

a processor, and a memory configured to store a computer-executable instructions, wherein the processor is configured to invoke and run the computer-executable instructions stored in the memory to cause the network device to perform:

sending a first Media Access Control (MAC) Control Element (CE) to a terminal device, wherein the first MAC CE carries first information and second information, wherein the first information is used for indicating whether each of a plurality of Serving Cells (SCells) is activated or deactivated, and the second information is used for indicating whether Temporary Reference Signals (TRSs) of at least part of the plurality of SCells are activated, wherein at least one first SCell of the plurality of SCells is activated through indication of the first information, and the second information is used for indicating whether a TRS of the at least one first SCell is activated, the second information comprises a TRS index corresponding to each of the at least one first SCell, wherein the TRS index is used for indicating whether a TRS of a first SCell corresponding to the TRS index is activated, wherein when the value of the TRS index is a first value, the TRS index is used for indicating that the TRS is not activated; and when the value of the TRS index is not the first value, the TRS index is used for indicating that the TRS is activated, wherein the TRS index is further used for indicating a TRS configuration in a case where the value of the TRS index is not the first value, and wherein the first information occupies 1 byte and is used for indicating whether each of the plurality of SCells is activated or deactivated.

17. The network device of claim 16, the second information further comprises a first parameter, a value of the first parameter being used for indicating whether the TRS is activated, when the value of the first parameter is a first value, the first parameter is used for indicating that the TRS is not activated; and when the value of the first parameter is a second value, the first parameter is used for indicating that the TRS is activated, wherein the second information comprises only the first parameter in a case where the value of the first parameter is the first value; and the second information further comprises at least one of TRS burst information or TRS offset information in a case where the value of the first parameter is the second value.

18. The network device of claim 16, wherein the first MAC CE further carries third information for indicating at least one of: whether each of the plurality of SCells is activated or deactivated, or whether a TRS of the SCell is activated, wherein the third information comprises N bits, each M bits among the N bits corresponds to one SCell, a value of the M bits is used for indicating whether the SCell corresponding to the M bits is activated or deactivated, or whether a TRS of the SCell is activated, where N and M are positive integers, wherein when a value of the M bits is a first value, the M bits are used for indicating that the SCell corresponding to the M bits is deactivated;

when a value of the M bits is a second value, the M bits are used for indicating that the SCell corresponding to the M bits is activated and the TRS of the SCell is not activated; and when a value of the M bits is a third value, the M bits are used for indicating that the SCell corresponding to the M bits is activated and the TRS of the SCell is activated.

19. The network device of claim 16, wherein the first MAC CE further carries fourth information comprising TRS information corresponding to each of at least one target SCell, wherein the target SCell is an activated SCell of which the TRS is activated.

20. The network device of claim 19, wherein the TRS information in the fourth information in an order from front to back corresponds to the at least one target SCell in an ascending order of SCell indexes; or the TRS information in the fourth information in the order from front to back corresponds to the at least one target SCell in a descending order of SCell indexes.

* * * * *